United States Patent [19]

Kuno et al.

[11] 4,325,336

[45] Apr. 20, 1982

[54] ELECTRONIC SPEED CONTROL SYSTEM FOR AUTOMOTIVE VEHICLES

[75] Inventors: Akira Kuno, Oobu; Takeshi Matsui; Yoshio Shinoda, both of Aichi, all of Japan

[73] Assignee: Nippon Soken, Inc., Nishio, Japan

[21] Appl. No.: 170,088

[22] Filed: Jul. 18, 1980

[30] Foreign Application Priority Data

Jul. 20, 1979 [JP] Japan .................................. 54-92754

[51] Int. Cl.³ .......................... F02D 5/00; B60K 31/00
[52] U.S. Cl. ............................... 123/350; 364/431.07; 180/179
[58] Field of Search ............... 123/350, 352, 354, 355; 364/431; 180/176, 179

[56] References Cited

U.S. PATENT DOCUMENTS

| | | | |
|---|---|---|---|
| 3,820,624 | 6/1974 | Sakakibara | 123/352 |
| 3,869,019 | 3/1975 | Cardani | 123/352 |
| 3,885,137 | 5/1975 | Ooya et al. | 180/176 |
| 4,224,907 | 9/1980 | Lefeuvre et al. | 123/352 |
| 4,250,854 | 2/1981 | Matsui et al. | 123/352 |

Primary Examiner—P. S. Lall
Attorney, Agent, or Firm—Cushman, Darby & Cushman

[57] ABSTRACT

In a speed control system for vehicles, a speed-difference calculation circuit calculates an absolute value of a time difference between a predetermined period of time corresponding with a desired speed and the actual period of time corresponding with the actual speed, an acceleration calculation circuit calculates an absolute value of a time difference between the preceding and following actual periods of time within a limited range, and correction signal generator calculates a sum of the absolute values when each sign of the calculated time differences is positive or negative and calculates a difference between the absolute values when respective signs of the calculated time differences are opposite to each other. The signal generator selectively produces correction signals related to the calculated sum and the calculated difference. A distribution circuit produces a control signal in response to the respective correction signals, and an actuator controls the opening angle of the engine throttle in response to the control signal.

5 Claims, 10 Drawing Figures

ELECTRONIC SPEED CONTROL SYSTEM FOR AUTOMOTIVE VEHICLES

BACKGROUND OF THE INVENTION

The present invention related to a speed control system for automotive vehicles, and more particularly to an improvement of an electronic speed control system for vehicles of the type in which the opening angle of the engine throttle is controlled in accordance with the actual speed of the vehicle and the rate of change of the actual speed in relation to a desired command speed.

For instance, in such a speed control system as disclosed in U.S. Pat. No. 3,983,954 issued on Oct. 5, 1976, voltages dependent on vehicle speed and rate of change of speed are compared with a reference voltage representing a desired speed and the resultant output is compared with a periodic signal to produce output pulses of constant frequency and of a width varying with the relative magnitudes of the input voltages. These pulses are applied to an electromagnetic valve which controls the admission of pulses of reduced gas pressure from the vehicle engine inlet manifold to a chamber of variable volume and the resultant movement of a wall of the chamber is employed to control the engine throttle. This means that operation of the electromagnetic valve is frequently conducted in response to the output pulses to maintain the vehicle speed in a predetermined value. As a result, it will be experienced that the life of electromagnetic valve is shortened due to its frequent operation.

SUMMARY OF THE INVENTION

Accordingly, the primary object of the present invention is directed to an improvement of an electronic speed control system for automotive vehicles in which the opening angle of the engine throttle is controlled in response to a control signal issued from the control system in accordance with a speed difference between the actual speed of the vehicle and a desired command speed and with the rate of change of the actual speed to restrain changes of acceleration of the vehicle and in which a value of the control signal is controlled to prevent the engine throttle from its sudden operation caused by sudden acceleration of the vehicle, chattering of a speed sensor, various detecting noises, and the like.

To accomplish the above object of the present invention, there is provided an electronic speed control system for an automotive vehicle driven by an internal combustion engine under control of a throttle valve, which control system comprises:

a timing signal generator for producing a timing signal with a period of time responsive to the actual speed of the vehicle;

a command-speed set circuit for producing a command signal indicative of a predetermined period of time defined by a desired speed of the vehicle;

a speed-difference calculation circuit responsive to the timing signal for calculating a first time difference between the predetermined period of time and the actual period of time of the timing signal and for producing a first difference signal indicative of an absolute value of the calculated first time difference and a first sign signal indicative of the positive or negative sign of the calculated first time difference;

an acceleration calculation circuit responsive to the timing signal for calculating a second time difference between respective actual periods of time of the preceding and following timing signals and for producing a second difference signal indicative of an absolute value of the calculated second time difference and a second sign signal indicative of the positive or negative sign of the calculated second time difference; and a logic circuit for limiting a value of the second difference signal to a predetermined maximum value when the actual acceleration of the vehicle exceeds a maximum value.

The control system further comprises:

a correction signal generator responsive to the timing signal for calculating a sum of the absolute values when respective signs of the first and second sign signals are identical to each other and for calculating a difference between the absolute values when respective signs of the first and second sign signals are opposite to each other, the correction signal generator producing first and second correction signals respectively indicative of the calculated sum and the calculated difference and ceasing to produce the first and second correction signals when the respective calculated values are zero;

a distribution circuit responsive to the timing signal and one of the first and second correction signals for selectively producing first and second control signals respectively in relation to the positive and negative signs of the second sign signal; and an actuator for decreasing and increasing the opening angle of the engine throttle respectively in response to the first and second control signals.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
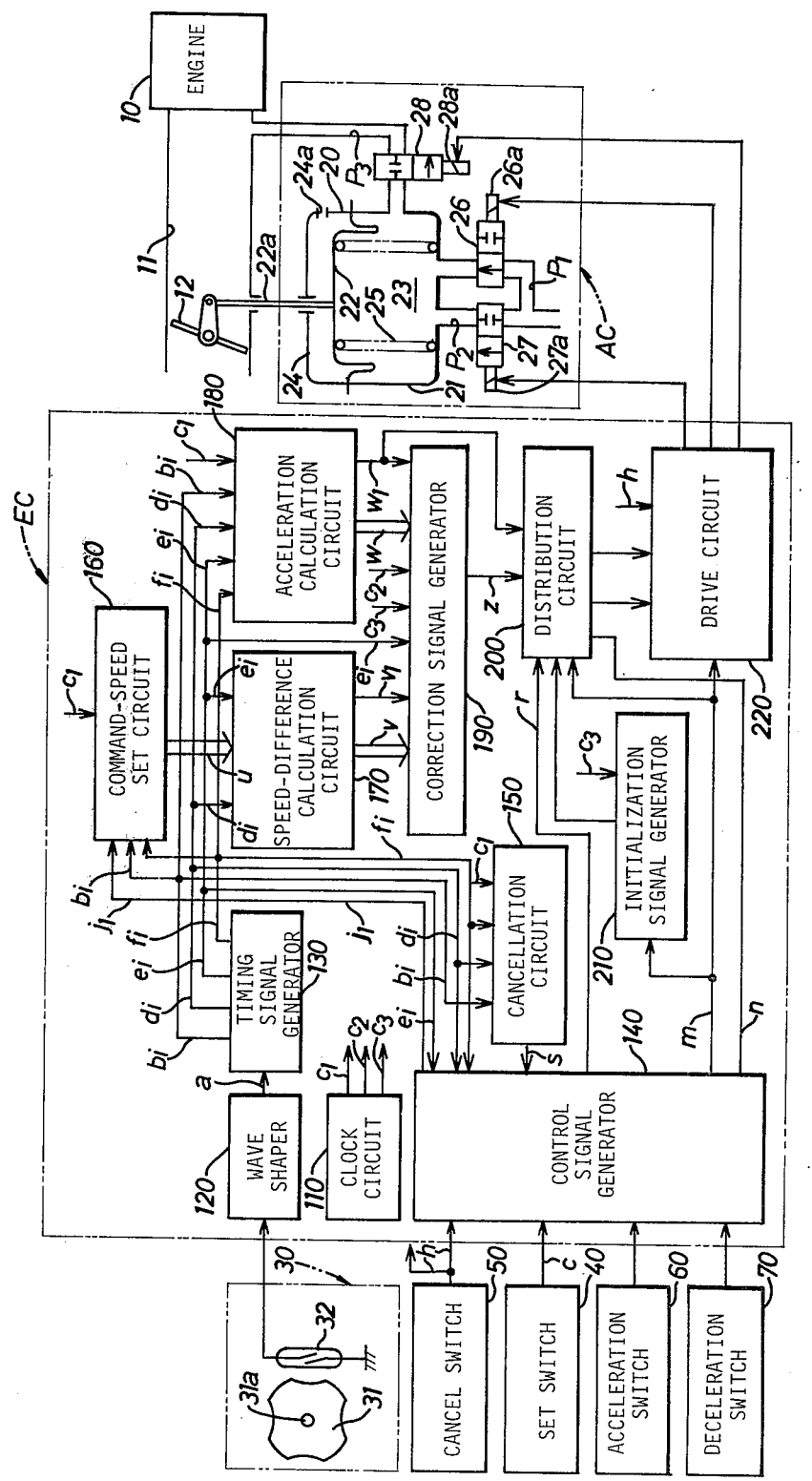
FIG. 1 is a schematic block diagram of an electronic speed control system in accordance with the present invention which is adapted to an automotive vehicle.

Reference is made to the drawings and particularly to FIG. 1 which illustrates a general arrangement of constructive parts of an electronic speed control apparatus according to the present invention by way of a schematic block diagram. The control apparatus comprises a throttle actuator AC for operating a throttle valve 12 provided within an air induction passage 11 of an internal combustion engine 10, and an electronic control circuit EC for activating the throttle actuator AC in response to each operation of a speed sensor 30, a manual set switch 40, a cancel switch 50, an acceleration switch 60 and a deceleration switch 70, as described in detail later.

The throttle actuator AC includes a vacuum servomotor 20 which is provided with a casing 21, a diaphragm 22 subdividing the interior of casing 21 into a servo-chamber 23 and an atmospheric chamber 24, and a compression coil spring 25 assembled within the servo-chamber 23 for biasing the diaphragm 22 toward the atmospheric chamber 24. The diaphragm 22 is linked with the throttle valve 12 by means of a rod 22a and is arranged to fully close the throttle valve 12 at its uppermost displaced position. The throttle actuator AC further includes a first solenoid valve 26 in the form of a normally open type, a second solenoid valve 27 in the form of a normally closed type, and a third solenoid valve 28 in the form of a normally closed type. The first the second solenoid valves 26 and 27 are disposed respectively within conduits $P_1$ and $P_2$, which are arranged to connect the servo-chamber 23 to the exterior. The third solenoid valve 28 is disposed within a conduit $P_3$, which is arranged to connect the servo-chamber 23 to the air induction passage 11.

The solenoid valves 26, 27 and 28 are provided with solenoids 26a, 27a and 28a respectively for receiving first, second and third output signals from the electronic control circuit EC. When the solenoid 26a is energized in response to the first output signal from control circuit EC, the first solenoid valve 26 is closed to interrupt supply of the atmospheric air across conduit $P_1$. When the solenoids 27a and 28a are energized respectively in response to the second and third output signals from control circuit EC, the solenoid valve 27 is opened to supply the atmospheric air into the servo-chamber 23 across conduit $P_2$ and the solenoid valve 28 is opened to supply the intake vacuum into the servo-chamber 23 across conduit $P_3$.

Figure 4:
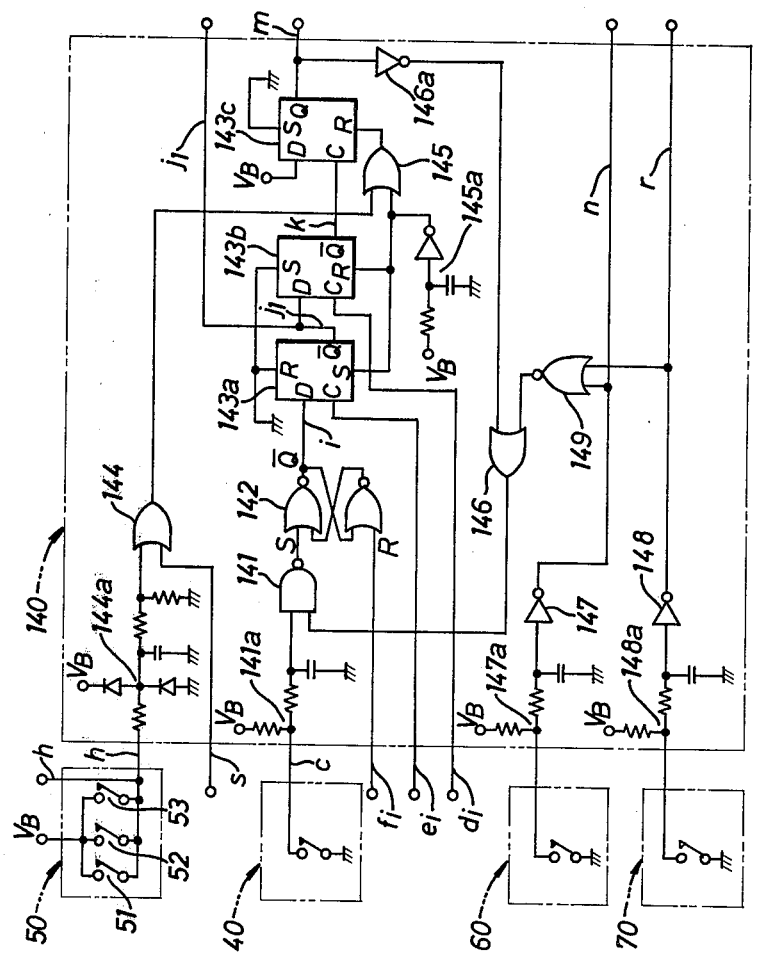
FIG. 4 is a circuit diagram of a preferred embodiment of the control signal generator shown in block form of FIG. 1 in relation to the various switches.

The speed sensor 30 includes a reed switch 32 which is located in magnetic coupling relationship with a disc 31 of permanent magnet. The disc 31 is drivingly coupled to a flexible cable 31a of a speedometer for the vehicle. The reed switch 32 is repetitively opened and closed due to rotation of the disc 31 to produce a series of electric signals respectively having a frequency proportional to an actual speed of the vehicle. The frequency of the electric signal from sensor 30 is, for instance, 42.5 Hz at a vehicle speed of 60 km/h. The manual set switch 40 is of a normally open type, as shown in FIG. 4, and is temporarily closed at a desired or command speed of the vehicle to produce therefrom a set signal c. (see FIG. 5) The set signal c is used as one necessary for setting the command speed in the control circuit EC.

The cancel switch 50 includes brake, clutch and parking switches 51, 52 and 53 which are respectively in the form of a normally open switch and connected in parallel to each other, as shown in FIG. 4. The brake switch 51 is provided on a foot brake pedal of the vehicle to be closed upon depression of the brake pedal, and the clutch switch 52 is provided on a clutch pedal of the vehicle to be closed upon actuation of the clutch pedal. The parking switch 53 is also provided on a parking mechanism of the vehicle to be closed upon manipulation of the parking mechanism. When one of the switches 51, 52 and 53 is closed, the cancel switch 50 produces therefrom a release signal h (see FIG. 5) for rendering the control circuit EC inoperative. The acceleration switch 60 is of a normally open type, as shown in FIG. 4, and is manually closed to produce an electric signal therefrom. The electric signal from acceleration switch 60 is used as one necessary for accelerating the vehicle during activation of the control circuit EC. The deceleration switch 70 is also in the form of a normally open switch and is manually closed to produce an electric signal therefrom. The electric signal from deceleration switch 70 is used as one for decelerating the vehicle during activation of the control circuit EC.

Figure 3:
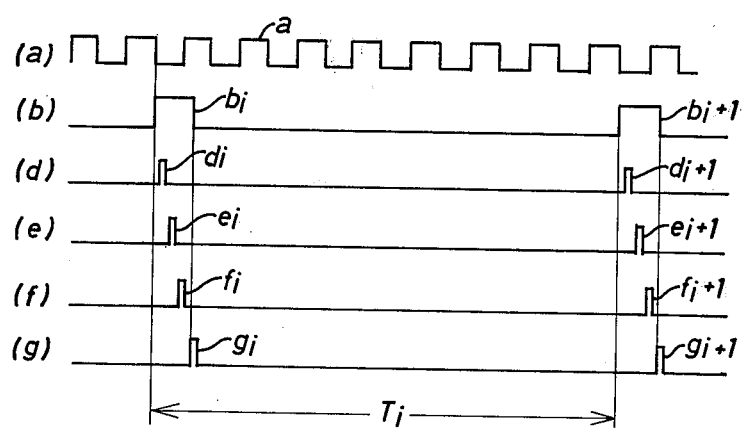
FIG. 3 illustrates waveforms obtained at various points in the wave shaper and timing signal generator.

As is illustrated in FIG. 1, the electronic control circuit EC comprises a clock signal generator 110, and a timing signal generator 130 connected through a wave shaper 120 to the speed sensor 30. The clock signal generator 110 acts to produce each series of first, second and third clock signals $C_1$, $C_2$ and $C_3$ therefrom at a predetermined frequency. Each of the electric signals from speed sensor 30 is reshaped by the wave shaper 120 into a series of rectangular pulse signals a, as shown in FIG. 3. The timing signal generator 130 produces therefrom gate, latch, preset and reset signals $b_i$, $d_i$, $e_i$ and $f_i (i=1, 2, \ldots)$ in accordance with each series of the first clock and pulse signals $C_1$ and a. In this instance, the gate signal $b_i$ is produced at a period of time $T_i$, as shown in FIG. 3.

Figure 5:
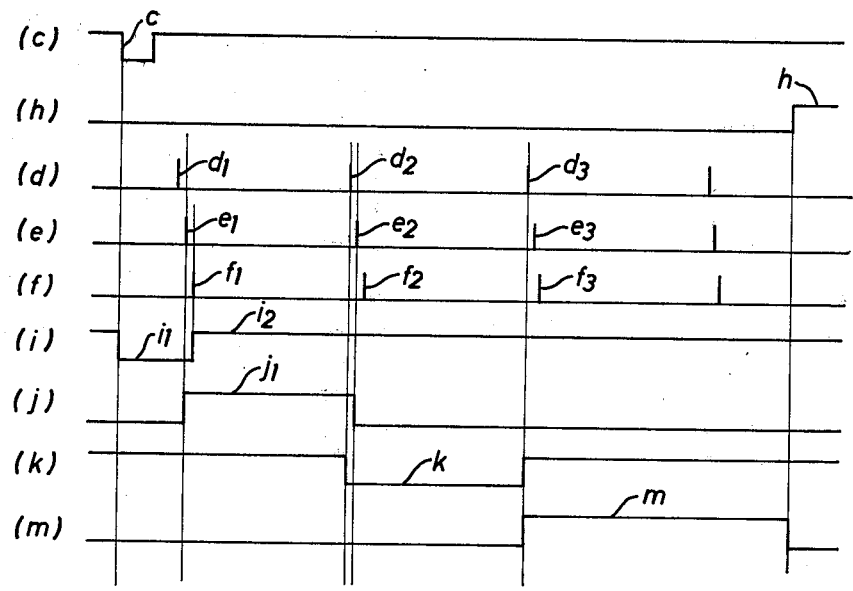
FIG. 5 illustrates waveforms obtained at various points in the control signal generator.

The electronic control circuit EC further comprises a control signal generator 140 which is connected to the switches 40 to 70, the timing signal generator 130 and a cancellation circuit 150. The control signal generator 140 is responsive to the set signal c from switch 40 and the latch, preset and reset signals $d_i$, $e_i$ and $f_i$ from timing signal generator 130 to produce therefrom a command-speed signal $j_1$ and an operation signal m, as shown in FIG. 5. The command-speed signal $j_1$ is applied to a command-speed set circuit 160, and the operation signal m is applied to a distribution circuit 200, an initial setting signal generator 210 and a drive circuit 220. The control signal generator 140 is responsive to the electric signal from acceleration switch 60 to produce an acceleration signal n therefrom and is also responsive to the electric signal from deceleration switch 70 to produce a deceleration signal r therefrom. The acceleration and deceleration signals n and r are respectively applied to the distribution circuit 200. Upon receiving the release signal h from cancel switch 50 or a release signal s from the cancellation circuit 150, the control signal generator 140 acts to reset the command-speed and operation signals $j_1$ and m.

The calcellation circuit 150 acts to produce the release signal s in accordance with a series of the first clock signals $C_1$ defined by the period of time $T_i$ of the gate signal $b_i$ and the latch and reset signals $d_i$ and $f_i$ from timing signal generator 130. The command-speed set circuit 160 is responsive to the gate and reset signals $b_i$ and $f_i$ from timing signal generator 130 to count the number of the first clock signals $C_1$ defined by the period of time $T_i$ of the gate signal $b_i$ and to memorize a binary signal u indicative of the command-speed of the vehicle. The binary signal u is applied to a speed-difference calculation circuit 170.

The speed-difference calculation circuit 170 is responsive to the preset signal $e_i$ from timing signal generator to calculate a first time difference between the value of binary signal u and the total of each period of time of the first clock signals $C_1$ defined by the period of time $T_i$ of gate signal $b_i$. Upon completion of the calculation, the calculation circuit 170 produces therefrom a binary signal v indicative of the calculated first time difference and also produces a sign signal $v_1$ indicative of a sign of the calculated first time difference. The calculated first time difference is calculated as a value corresponding with a speed difference between the actual and command speeds of the vehicle. Thus, the binary and sign signals v and $v_1$ are latched and applied by the calculation circuit 170 to a correction signal generator 190 in response to the latch signal $d_i$ from timing signal generator 130.

An acceleration calculation circuit 180 is responsive to the preset and reset signals $e_i$ and $f_i$ from timing signal generator 130 to calculate a second time difference between the total of each period of time of the first clock signals $C_1$ defined by the period of time $T_i$ of gate signal $b_i$ and the other total of each period of time of the first clock signals $C_1$ defined by a period of time $T_{i+1}$ of the following gate signal $b_{i+1}$. In this case, the calculation circuit 180 is arranged to calculate the second time difference within a limited range of a predetermined acceleration. Upon completion of the calculation, the calculation circuit 180 is responsive to the preset and reset signals $e_i$ and $f_i$ from timing signal generator 130 to produce therefrom a binary signal w indicative of the calculated second time difference and to produce a sign signal $w_1$ indicative of a sign of the calculated second time difference. The calculated second time difference is calculated as a value corresponding with the actual acceleration of the vehicle. Thus, the binary signal w is latched and applied by the calculation circuit 180 to the correction signal generator 190 in response to the latch signal $d_i$ from timing signal generator 130, and simultaneously the sign signal $w_1$ is latched and applied to the correction signal generator 190 and the distribution circuit 200.

The correction signal generator 190 is responsive to the preset signal $e_i$ from timing signal generator 130 and the sign signals $v_1$, $w_1$ from calculation circuits 170, 180 to calculate respective values of the binary signals v and w in accordance with each series of second and third clock signals $C_2$, $C_3$ from clock signal generator 110. Upon completion of the calculation, the correction signal generator 190 produces therefrom a correction signal z with a width defined by a sum or difference of values of the binary signals v and w. The correction signal z is applied to the distribution circuit 200.

The initial setting signal generator 210 is responsive to the operation signal m from control signal generator 140 to produce an initial setting signal therefrom in accordance with a series of the third clock signals $C_3$ from clock signal generator 110. The initial setting signal is used for setting the angular position of throttle valve 12 at the initial stage, as described in detail later. The distribution circuit 200 is responsive to the initial setting signal from generator 210 to produce a high level signal therefrom and is respectively responsive to the sign signal $w_1$ from calculation circuit 180, the correction signal z from generator 190 and the operation signal m from control signal generator 140 to produce a high level signal therefrom. The distribution circuit 200 is also responsive to the acceleration signal n or the deceleration signal r and the operation signal m from control signal generator 140 to produce a high level signal therefrom. The drive circuit 220 is responsive to the operation signal m from control signal generator 140 to produce the first output signal therefrom and is responsive to the high level signal from distribution circuit 200 to produce the second or third output signal therefrom. The drive circuit 220 is further responsive to the release signal h from cancel switch 50 to make the first output signal a low level signal.

Figure 2:
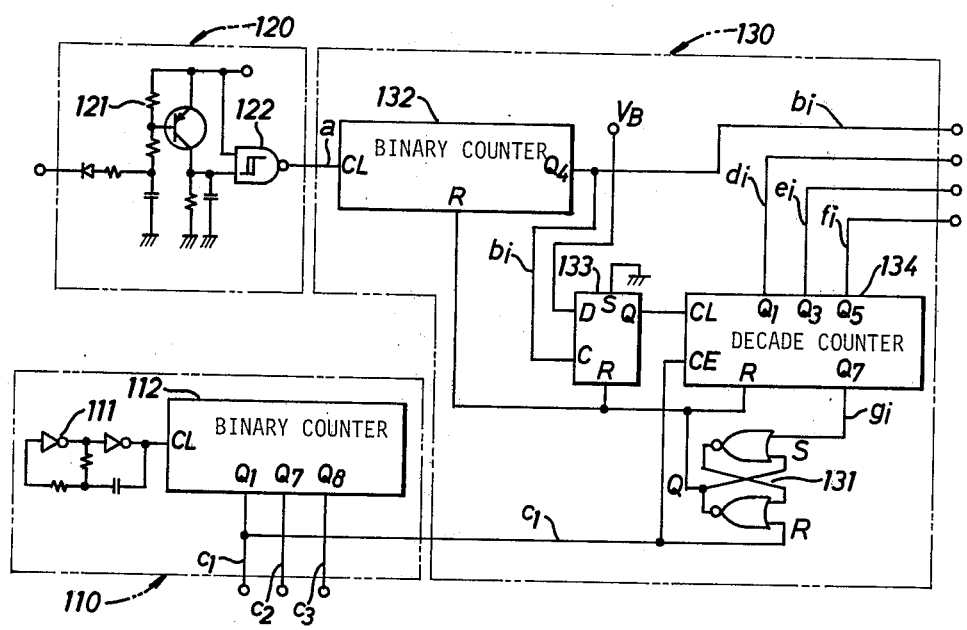
FIG. 2 illustrates each preferred embodiment of the wave shaper, clock circuit and timing signal generator respectively shown in block form in FIG. 1.

In FIG. 2, there is illustrated each preferred embodiment of the clock signal generator 110, the wave shaper 120 and the timing signal generator 130. As can be well seen in the figure, the clock signal generator 110 includes a binary counter 112 for receiving a series of pulse signals from an oscillator 111. The binary counter 112 serves to count the pulse signals from oscillator 111 in such a manner as to produce the first, second and third clock signals $C_1$, $C_2$ and $C_3$ at its output terminals $Q_1$, $Q_7$ and $Q_8$ respectively. In this embodiment, respective frequencies of first, second and third clock signals $C_1$, $C_2$ and $C_3$ are determined as 8 KHz, 125 Hz and 62.5 Hz. The wave shaper 120 includes a switching circuit 121 for receiving a series of the pulse signals from speed sensor 30. Each of the pulse signals from sensor 30 is reshaped by the switching circuit 121 and applied as a reshaped signal to a NAND gate 122 of CD 4093 manufactured by RCA Corporation in U.S. A. NAND gate 122 has schmitt-trigger function and produces the rectangular pulse signal a (see FIG. 3) in response to each reshaped signal from switching circuit 121.

The timing signal generator 130 includes a RS-flip flop 131 which is connected to a binary counter 132, a D-flip flop 133 and a decade counter 134. The flip flop 131 has a reset terminal R for receiving a series of the first clock signals $C_1$ from clock circuit 110 and a set terminal S for receiving a high level signal $g_i$ from the decade counter 134. The flip flop 131 is responsive to the high level signal $g_i$ from counter 134 to produce a high level signal at its output terminal Q and is also responsive to the first clock signal $C_1$ of high level to produce a low level signal at its output terminal Q. The binary counter 132 is of CD 4024 type which is manufactured by RCA Corporation. The counter 132 is provided with a reset terminal R connected to the output terminal Q of flip flop 131 and a clock terminal CL connected to the output terminal of wave shaper 120. The counter 132 is responsive to the low level signal from flip flop 131 to count a series of the rectangular pulse signals a from wave shaper 120 and to produce the gate signal $b_i$ at its output terminal $Q_4$. The period of time $T_i$ of gate signal $b_i$ corresponds with a frequency which is one-eighth as high as that of rectangular pulse signal a, the leading edge of gate signal $b_i$ corresponding with the trailing edge of rectangular pulse signal a. (see FIG. 3)

D-flip flop 133 is of CD 4013 type which is manufactured by RCA Corporation and includes a pair of NOR-gates. The flip flop 133 is provided with a reset terminal R for receiving the high or low level signal from RS-flip flop 131 and also provided with a clock terminal C for receiving the gate signal $b_i$ from counter 132 and an input terminal D for receiving a DC voltage $V_B$ from an electric power source in the form of a vehicle battery. Upon receiving the low level signal from flip flop 131 and the gate signal $b_i$ from binary counter 132, the flip flop 133 produces a high level signal at its output terminal Q.

The decade counter 134 is of CD 4017 type which is manufactured by RCA Corporation. The counter 134 is provided with a clock-enable terminal CE for receiving a series of the first clock signals $C_1$ from clock circuit 110 and with reset and clock terminals R and CL for respectively receiving the low or high level signals from RS-flip flop 131 and D-flip flop 133. Upon receiving the high level signal from RS-flip flop 131, the counter 134 is reset to produce low level signals respectively at its output terminals $Q_1$, $Q_3$, $Q_5$ and $Q_7$. In response to the low level signal from RS-flip flop 131 and the high level signal from D-flip flop 133, the counter 134 acts to count a series of the first clock signals $C_1$ and to produce the latch, preset, reset and high level signals $d_i$, $e_i$, $f_i$ and $g_i$ at its output terminals $Q_1$, $Q_3$, $Q_5$ and $Q_7$ respectively. In this instance, the latch, preset and reset signals $d_i$, $e_i$ and $f_i$ are produced during generation of the gate signal $b_i$, and the high level signal $g_i$ is applied to RS-flip flop 131 to make the gate signal $b_i$ a low level signal. (see FIG. 3) Sequentially, the counters 132, 134 and the flip flop 133 are reset in response to the high level signal from RS-flip flop 131 to produce low level signals therefrom so as to prohibit the counting operation of counter 134. Thereafter, the reset condition of counters 132, 134 and flip flop 133 is released in response to the low level signal from RS-flip flop 131. From the above description, it will be understood that the timing signal generator 130 acts to produce the gate signal $b_i$ in response to the reshaped pulse signals a from wave shaper 120 and to produce the respective signals $d_i$, $e_i$, $f_i$ and $g_i$ in response to the gate signal $b_i$, as shown in FIG. 3.

FIG. 4 illustrates a preferred embodiment of the control signal generator 140 which includes an RS-flop flop 142 controlled by a NAND-gate 141 and the timing signal generator 130. NAND-gate 141 has a first input terminal for selectively receiving the DC voltage $V_B$ from the vehicle battery or the set signal c from set switch 40 through a protective circuit 141a. NAND-gate 141 is also provided with a second input terminal for receiving a high or low level signal from an OR-gate 146, as described below. Upon receiving the DC voltage $V_B$ and the high level signal from OR-gate 146, NAND-gate 141 produces a low level signal at its output terminal. In response to the set signal c from set switch 40 and/or the low level signal from OR-gate 146, NAND-gate 141 produces a high level signal at its output terminal. RS-flip flop 142 is composed of a pair of NOR-gates and is provided with a set terminal S for receiving the high or low level signal from NAND-gate 141. RS-flip flop 142 is also provided with a reset terminal R for receiving the reset signal $f_i$ from timing signal generator 130. Upon receiving the low level signal from NAND-gate 141, the flip flop 142 produces a high level signal $i_2$ at its output terminal $\overline{Q}$, as shown in FIG. 5. In response to the high level signal from NAND-gate 141, the flip flop 142 is inversed to produce a low level signal $i_1$ at its output terminal $\overline{Q}$. Thereafter, the flip flop 142 produces the high level signal $i_2$ therefrom in response to the reset signal $f_i$ from timing signal generator 130.

The control signal generator 140 further includes a pair of D-flip flops 143a and 143b of CD 4013 type, manufactured by RCA Corporation, which are controlled by a power-on reset circuit 145a. The power-on reset circuit 145a has an inverter which receives DC voltage $V_B$ from the vehicle battery through a resistor and a capacitor to produce a reset signal therefrom. D-flip flop 143a is provided with an input terminal D for receiving any one of the low and high level signals $i_1$ and $i_2$ from RS-flip flop 142 and provided with reset and clock terminals S and C for respectively receiving the reset signal from power-on reset circuit 145a and the preset signal $e_i$ from timing signal generator 130. Upon receiving the reset signal from power-on reset circuit 145a and the preset signal $e_i$ from timing signal generator 130, D-flip flop 143a produces a command-speed signal $j_1$ of high level in response to the low level signal $i_1$ from RS-flip flop 142. When the timing signal generator 130 produces the following preset signal therefrom, D-flip flop 143a acts to make the command-speed signal $j_1$ a low level signal in response to the high level signal $i_2$ from RS-flip flop 142.

D-flip flop 143b is provided with an input terminal D for receiving the command-speed signal $j_1$ from D-flip flop 143a and provided with reset and clock termials R and C for respectively receiving the reset signal from reset circuit 145a and the latch signal $d_i$ from timing signal generator 130. Upon receiving the reset signal from reset circuit 145a and the latch signal $d_i$ from timing signal generator 130, D-flip flop 143b acts to produce a low level signal k at its output terminal $\overline{Q}$ in response to the command-speed signal $j_1$ from D-flip flop 143a. When the following latch signal is produced from timing signal generator 130, D-flip flop 143b acts to make the low level signal k a high level signal in response to the low level signal from D-flip flop 143a.

In the control signal generator 140, an OR-gate 144 is provided with a first input terminal for receiving the release signal h from cancel switch 50 through a protective circuit 144a and with a second input terminal for receiving the release signal s from cancellation circuit 150. OR-gate 144 acts to produce a high level signal in response to any one of the release signals h and s. When the release signal s is low level under the opened condition of cancel switch 50, OR-gate 144 produces a low level signal at its output terminal. An OR-gate 145 is provided with input terminals for respectively receiving the low or high level signal from OR-gate 144 and the reset signal from power-on reset circuit 145a. OR-gate 145 acts to produce a high level signal in response to the high level signal from OR-gate 144 and the reset signal from power-on reset circuit 145a and to produce a low level signal in response to the low level signal from OR-gate 144 and the reset signal from power-on reset circuit 145a. A D-flip flop 143c is provided with an input terminal D for receiving DC voltage $V_B$ from the vehicle battery and with reset and clock terminals R and C for receiving the low or high level signals from OR-gate 145 and D-flip flop 143b respectively. Upon receiving the high level signal from OR-gate 145, D-flip flop 143c produces a low level signal at its output terminal Q. In response to the low level signal from OR-gate 145, D-flip flop 143c is reset to produce a high level signal as the operation signal m at the trailing edge of the low level signal k from D-flip flop 143b.

OR-gate 146 has input terminals for respectively receiving output signals from an inverter 146a and a NOR-gate 149. The inverter 146a acts to invert the operation signal m from D-flip flop 143c, and NOR-gate 149 has input terminals for respectively receiving output signals from inverters 147 and 148. The inverter 147 receives DC voltage $V_B$ from the vehicle battery through a protective circuit 147a to produce a low level signal therefrom. When the acceleration switch 60 is closed, the inverter 147 acts to produce an acceleration signal n of high level in response to the electric signal from switch 60. Meanwhile, the inverter 148 receives DC voltage $V_B$ from the vehicle battery through a protective circuit 148a to produce a low level signal. When the deceleration switch 70 is closed, the inverter 148 acts to produce a deceleration signal r of high level in response to the electric signal from switch 70. Thus, NOR-gate 149 acts to produce a high level signal in response to the low level signals respectively from inverters 147 and 148. NOR-gate 149 also produces a low level signal in response to any one of the acceleration and deceleration signals n and r respectively from inverters 147 and 148. OR-gate 146 acts to produce a low level signal in response to the low level signal from inverter 146a and NOR-gate 149. OR-gate 146 also produces a high level signal in response to any one of the high level signals from inverter 146a and NOR-gate 149. In addition, the protective circuits 141a, 144a, 147a and 148a are provided to protect NAND-gate 141, OR-gate 144, and inverters 147 and 148 respectively.

Figure 6:
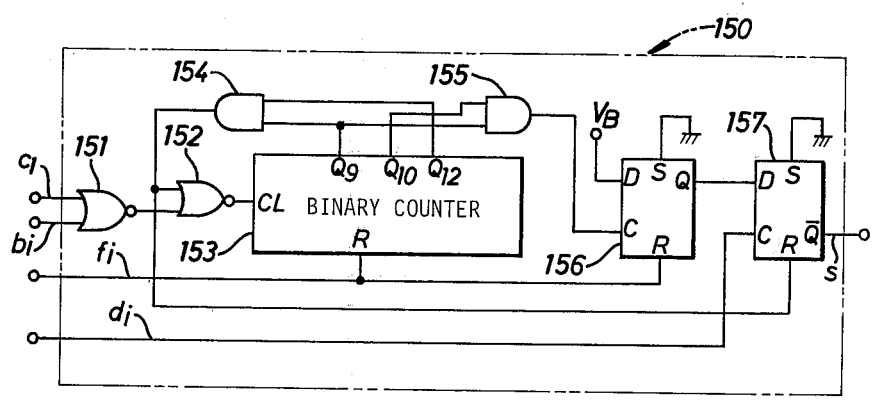
FIG. 6 is a circuit diagram of a preferred embodiment of the cancellation circuit shown in block form in FIG. 1.

In FIG. 6, there is illustrated a preferred embodiment of the cancellation circuit 150 which comprises a binary counter 153 connected to the clock circuit 110 and timing signal generator 130 through NOR-gates 151, 152. NOR-gate 151 is provided with input terminals for receiving a series of the first clock signals $C_1$ from clock circuit 110 and the gate signal $b_i$ from timing signal generator 130. NOR-gate 151 produces a low level signal in response to the gate and first clock signals $b_i$ and $C_1$. When the level of gate signal $b_i$ is low, NOR-gate 151 produces a pulse signal in sequence in response to each of the first clock signals $C_1$. NOR-gate 152 has input terminals for receiving a series of the pulse signals from NOR-gate 151 and an output signal from an AND-gate 154. When the output signal from AND-gate 154 is low level, NOR-gate 152 acts to produce each of the pulse signals from NOR-gate 151 as each of the first clock signals $C_1$ in sequence. When the output signal from AND-gate 154 is high level, NOR-gate 152 acts to produce a low level signal in response to the pulse signals from NOR-gate 151. This means that NOR-gate 152 produces a series of the first clock signals $C_1$ defined by the period of time $T_i$ of gate signal $b_i$. In this instance, the time interval between the gate signals $b_i$ is deemed substantially equal to the period of time $T_i$ because the width of gate signal $b_i$ is very narrow.

The binary counter 153 is of CD 4020 type which is manufactured by RCA Corporation. The counter 153 is provided with a reset terminal R for receiving the reset signal $f_i$ from timing signal generator 130 and with a clock terminal CL for receiving a series of the first clock signals $C_1$ from NOR-gate 152. Upon receiving the reset signal $f_i$, the counter 153 is reset to count the first clock signals $C_1$ and to produce high level signals at its output terminals $Q_9$, $Q_{10}$ and $Q_{12}$. The counting operation in counter 153 is prohibited by the low level signal from NOR-gate 152. In this instance, the number of the first clock signals $C_1$ counted by counter 153 will vary in accordance with a change of the period of time $T_i$ of gate signal $b_i$. If the counted value is less than 768, the counter 153 will produce a high level signal only at its output terminal $Q_9$. If the counted value is more than 768 and less than 2304, the counter 153 will produce high level signals respectively at its output terminals $Q_9$ and $Q_{10}$. If the counted value is more than 2304, the counter 153 will produce high level signals respectively at its output terminals $Q_9$ and $Q_{12}$. In the above description, the number less than 768 means the vehicle speed more than 230 km/h, and the number less than 2304 means the vehicle speed more than 40 km/h.

AND-gate 154 has input terminals connected to the output terminals $Q_9$ and $Q_{12}$ of counter 153. Upon receiving the high level signals appearing at the output terminals $Q_9$ and $Q_{12}$, AND-gate 154 acts to produce a high level signal. In response to any one of low level signals appearing at the output terminals $Q_9$ and $Q_{12}$, AND-gate 154 produces a low level signal. An AND-gate 155 has input terminals connected to the output terminals $Q_9$ and $Q_{10}$ of counter 153. Upon receiving the high level signals appearing at the output terminals $Q_9$ and $Q_{10}$, AND-gate 155 acts to produce a high level signal. In response to any one of low level signals appearing at the output terminals $Q_9$ and $Q_{10}$, AND-gate 155 produces a low level signal.

A D-flip flop 156 is provided with a clock terminal C for receiving the high or low level signal from AND-gate 155 and provided with input and reset terminals for respectively receiving DC voltage $V_B$ from the vehicle battery and the reset signal $f_i$ from timing signal generator 130. Upon receiving the reset signal $f_i$ from timing signal generator 130 and the low level signal from AND-gate 155, D-flip flop 156 produces a low level signal at its output terminal Q. D-flip flop 156 is also responsive to the high level signal from AND-gate 155 to produce a high level signal. A D-flip flop 157 is provided with a reset terminal R for receiving the high or low level signal from AND-gate 154 and provided with input and clock terminals D and C for respectively receiving the high or low level signal from D-flip flop 156 and the latch signal $d_i$ from timing signal generator 130. In response to the low level signal from AND-gate 154 and the latch signal $d_i$ from timing signal generator 130, D-flip flop 157 produces a low level signal at its output terminal $\overline{Q}$ in response to the high level signal from D-flip flop 156. Upon receiving the high level signal from AND-gate 154 and the latch signal $d_i$ from timing signal generator 130, D-flip flop 157 produces a release signal s of high level in response to the low level signal from D-flip flop 156.

Figure 7:
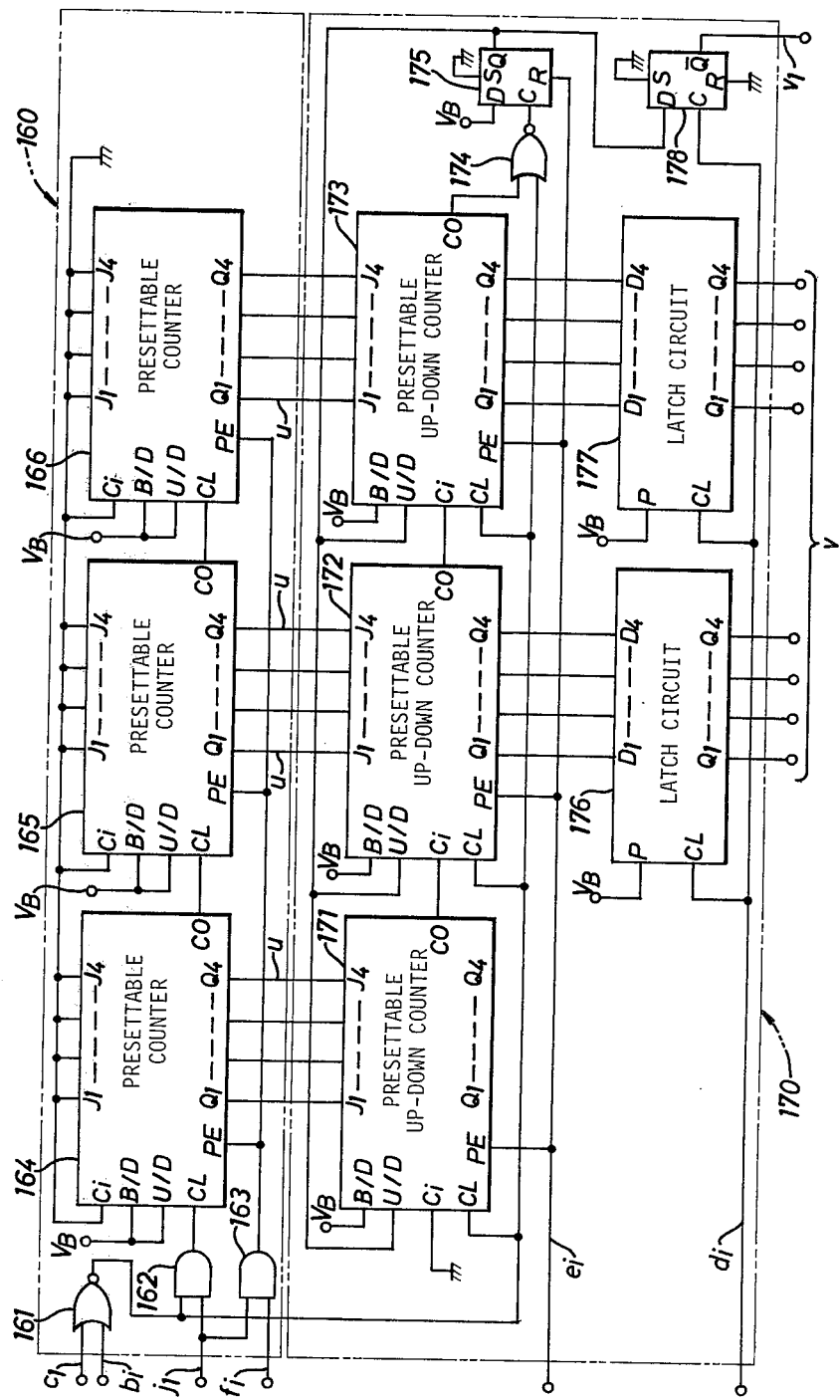
FIG. 7 illustrates each preferred embodiment of the command-speed set circuit and speed-difference calculation circuit respectively shown in block form in FIG. 1.

In FIG. 7, there are illustrated each preferred embodiment of the command-speed set circuit 160 and the speed-difference calculation circuit 170. The command-speed set circuit 160 includes presettable up-down counters 164, 165 and 166 which are under the control of a NOR-gate 161 and AND-gates 162, 163. NOR-gate 161 has input terminals for respectively receiving a series of the first clock signals $C_1$ and the gate signal $b_i$ from timing signal generator 130. During generation of the gate signal $b_i$, NOR-gate 161 produces a low level signal in response to the first clock signals $C_1$. When the gate signal $b_i$ becomes low level, NOR-gate 161 produces a pulse signal in sequence in response to each of the first clock signals $C_1$. AND-gate 162 has input terminals for respectively receiving a series of the pulse signals from NOR-gate 161 and the command-speed signal $j_1$ from control signal generator 140. During generation of the command-speed signal $j_1$, AND-gate 162 produces a series of pulse signals in response to the pulse signals from NOR-gate 161. When the command-speed signal $j_1$ becomes low level, AND-gate 162 produces a low level signal. AND-gate 163 receives at its input terminals the command-speed signal $j_1$ from control signal generator 140 and the reset signal $f_i$ from timing signal generator 130 to produce a preset signal therefrom. When any one of the signals $j_1$ and $f_i$ is low level, AND-gate 163 produces a low level signal.

The presettable up-down counters 164, 165 and 166 are respectively of CD 4029 type manufactured by RCA Corporation. Each of the counters 164, 165 and 166 is provided with input terminals B/D and U/D for receiving DC voltage $V_B$ from the vehicle battery and is also provided with jam input terminals $J_1$ to $J_4$ grounded respectively. This means that each of the counters 164, 165 and 166 serves to function as a four-bit up counter. The counter 164 is provided with a clock terminal CL for receiving a series of the pulse signals from AND-gate 162 and a preset-enable terminal PE for receiving the preset signal from AND-gate 163. Upon receiving the preset signal from AND-gate 163, the counter 164 is reset to produce low level signals at its carry-out and output terminals CO and $Q_1$ to $Q_4$. After released from the reset condition in response to the low level signal from AND-gate 163, the counter 164 starts to count up a series of the pulse signals from AND-gate 162 to produce a high level signal at its carry-out terminal CO. When a value counted up in counter 164 reaches the maximum value, the counter 164 produces output signals indicative of the maximum value at its output terminals $Q_1$ to $Q_4$ and produces a low level signal at its carry-out terminal CO. The operation of counter 164 is repeated during generation of a series of the pulse signals from AND-gate 162 and is stopped in response to the low level signal from AND-gate 162.

The presettable up-down counter 165 is provided with a clock terminal CL for receiving a series of the high level signals from the carry-out terminal CO of counter 164 and a preset-enable terminal PE for receiving the preset signal from AND-gate 163. Upon receiving the preset signal from AND-gate 163, the counter 165 is reset to produce low level signals at its carryout and output terminals CO and $Q_1$ to $Q_4$. After released from the reset condition in response to the low level signal from AND-gate 163, the counter 165 starts to count up a series of the high level signals from counter 164 to produce a high level signal at its carry-out terminal CO. When a value counted up in counter 165 reaches the maximum value, the counter 165 produces output signals indicative of the maximum value at its output terminals $Q_1$ to $Q_4$ and produces a low level signal at its carry-out terminal CO. The operation of counter 164 is repeated during generation of the series of the high level signals from counter 164 and ceases when the operation of counter 164 is stopped.

The presettable up-down counter 166 is provided with a clock terminal CL for receiving a series of the high level signals from the carry-out terminal CO of counter 165 and a preset-enable terminal PE for receiving the preset signal from AND-gate 163. In response to the preset signal from AND-gate 163, the counter 166 is reset to produce low level signals at its output terminals $Q_1$ to $Q_4$. After released from the reset condition in response to the low level signal from AND-gate 163, the counter 166 starts to count up a series of the high level signals from counter 165. Upon completion of the counting operation in counter 166, all the output signals from counters 164 to 166 are latched and applied to the speed-difference calculation circuit 170 as a binary signal u indicative of the period of time $T_i$ of gate signal $b_i$. In other words, this means that the binary signal u is defined by the actual vehicle speed when the set switch 40 is closed.

The speed-difference calculation circuit 170 includes a D-flip flop 175 which is controlled by a NOR-gate 174 and the timing signal generator 130. NOR-gate 174 has input terminals respectively connected to NOR-gate 161 and a carry-out terminal CO of a presettable up-down counter 173. NOR-gate 174 is responsive to the low level signals from NOR-gate 161 and counter 173 to produce a high level signal and is responsive to any one of the pulse signals from NOR-gate 161 and the high level signal from counter 173 to produce a low level signal. D-flip flop 175 is provided with an input terminal connected to the vehicle battery, a clock terminal connected to NOR-gate 174, and a reset terminal R connected to the timing signal generator 130. In response to the preset signal $e_i$ from timing signal generator 130 and the low level signal from NOR-gate 174, D-flip flop 175 is reset to produce a low level signal at its output terminal Q. After released from the reset condition at a trailing edge of preset signal $e_i$, D-flip flop 175 produces a high level signal therefrom in response to the high level signal from NOR-gate 174.

The speed-difference calculation circuit 170 further includes three presettable up-down counters 171, 172 and 173 which are of CD 4029 type manufactured by RCA Corporation. The counter 171 is provided with jam input terminals $J_1$ to $J_4$ for respectively receiving the output signals from counter 164 and provided with input terminals B/D and U/D for respectively receiving DC voltage $V_B$ from the vehicle battery and the low or high level signal from D-flip flop 175. The counter 171 is also provided with a clock terminal CL for receiving the pulse signals from NOR-gate 161 and with a preset-enable terminal PE for receiving the preset signal $e_i$ from timing signal generator 130 and a carry-in terminal $C_i$ of counter 171 grounded. In response to the preset signal $e_i$ from timing signal generator 130, the counter 171 is reset to receive the output signals from counter 164 and to produce a high level signal at its carry-out terminal CO. After released from the preset condition at the trailing edge of preset signal $e_i$, the counter 171 starts to count down the output signals from counter 164 in accordance with a series of the pulse signals from NOR-gate 161 during generation of the low level signal from D-flip flop 175. The counter 171 is maintained to produce the high level signal during its count-down operation and produces a low level signal at its carry-out terminal CO when a value counted down in counter 171 reaches zero. This count-down operation in counter 171 is repeated to alternatively produce high and low level signals from the carry-out terminal CO of counter 171.

In case the high level signal appears from D-flip flop 175, the counter 171 starts to count up the remaining pulse signals from NOR-gate 161 so as to produce a high level signal at its carry-out terminal CO. Then, the counter 171 is maintained to produce the high level signal during its count-up operation and produces a low level signal at its carry-out terminal CO when a value counted up in counter 171 reaches the maximum value. This count-up operation in counter 171 is repeated to alternatively produce high and low level signals from the carry-out terminal CO of counter 171 and is stopped in response to the low level signal from NOR-gate 161.

The presettable up-down counter 172 is provided with jam input terminals $J_1$ to $J_4$ for receiving the output signals from counter 165 and a carry-in terminal $C_i$ for receiving the high or low level signal from counter 171, the remaining constructions of counter 172 being the same as those of the counter 171. Upon receiving the preset signal $e_i$ from timing signal generator 130, the counter 172 is reset to receive therein the output signals from counter 165. In this instance, the count-down operation in counter 172 is inhibited due to the high level signal from counter 171. In response to the low level signal from counter 171, the counter 172 starts to count down the output signals from counter 165 in accordance with a series of the pulse signals from NOR-gate 161 during generation of the low level signal from D-flip flop 175. This count-down operation in counter 172 is repeated in response to each low level signal from counter 171 during generation of the low level signal from D-flip flop 175 to alternatively produce high and low level signals at its carry-out terminal CO. In case the count-down operation in counter 172 is completed during generation of the low level signal from D-flip flop 175, the counter 172 produces output signals at its output terminals $Q_1$ to $Q_4$ upon completion of its count-down operation. In case the high level signal appears from D-flip flop 175, the counter 172 repetitively counts up the remaining pulse signals from NOR-gate 161 in response to each low level signal from counter 171 to alternatively produce high and low level signals at its carry-out terminal CO. Upon completion of the count-up operation, the counter 172 produces output signals at its output terminals $Q_1$ to $Q_4$.

The presettable up-down counter 173 is provided with jam input terminals $J_1$ to $J_4$ for receiving the output signals from counter 166 and a carry-in terminal $C_i$ for receiving the high or low level signal from counter 172, the remaining constructions being the same as those of the counter 171. Upon receiving the preset signal $e_i$ from timing signal generator 130, the counter 173 is reset to receive therein the output signals from counter 166. In this instance, the count-down operation in counter 173 is inhibited due to the high level signal from counter 172. In response to the low level signal from counter 172, the counter 173 starts to count down the output signals from counter 166 in accordance with a series of the pulse signals from NOR-gate 161 during generation of the low level signal from D-flip flop 175. This count-down operation in counter 173 is conducted in response to each low level signal from counter 172 during generation of the low level signal from D-flip flop 175 to maintain generation of the high level signal from counter 173. In case a period of time represented by the binary signal u is longer than that of gate signal $b_i$, the counter 173 will produce output signals at its output terminals $Q_1$ to $Q_4$ upon completion of its count-down operation and will be maintained to produce the high level signal at its carryout terminal CO. In case the period of time represented by the binary signal u is shorter than that of gate signal $b_i$, the counter 173 will produce a low level signal at its carry-out terminal CO upon reach of counted value down to zero. Then, the counter 173 counts up the remaining pulse signals from NOR-gate 161 in response to each low level signal from counter 172 during generation of the high level signal from D-flip flop 175 to produce output signals at its output terminals $Q_1$ to $Q_4$ upon completion of its count-up operation.

In summary, in case the period of time represented by the binary signal u is shorter than the total period of time of a series of the pulse signals issued from NOR-gate 161 within the period of time $T_i$ of gate signal $b_i$, all the counters 171, 172 and 173 count down the value of binary signal u in accordance with a series of the pulse signals from NOR-gate 161 during generation of the low level signal from D-flip flop 175. Subsequently, the counters 171, 172 and 173 count up the remaining pulse signals in response to the high level signal from D-flip flop 175 in such a manner that the counters 172 and 173 produce a binary signal indicative of an absolute value of a time difference between the value of binary signal u and the total period of time of the pulse signals from NOR-gate 161, the time difference having a negative sign defined by the high level signal from D-flip flop 175. In case the period of time represented by the binary signal u is longer than the total period of time of a series of the pulse signals from NOR-gate 161, all the counters 171, 172 and 173 count down the value of binary signal u in accordance with all the pulse signals from NOR-gate 161 during generation of the low level signal from D-flip flop 175 in such a manner that the counters 172 and 173 produce a binary signal indicative of an absolute value of another time difference between the value of binary signal u and the total period of time of the pulse signals from NOR-gate 161, the other time difference having a positive sign defined by the low level signal from D-flip flop 175.

The speed-difference calculation circuit 170 also includes a pair of latch circuits 176 and 177 which are controlled by the timing signal generator 130. The latch circuit 176 latches therein the output signals from counter 172 in response to the latch signal $d_i$ from timing signal generator 130 to produce the same at its output terminals $Q_1$ to $Q_4$. The latch circuit 177 also latches therein the output signals from counter 173 in response to the latch signal $d_i$ to produce the same at its output terminals $Q_1$ to $Q_4$. A D-flip flop 178 has an input terminal D for receiving the low or high level signal from D-flip flop 175 and a clock terminal C for receiving the latch signal $d_i$ from timing signal generator 130. Upon receiving the low level signal from D-flip flop 175, D-flip flop 178 produces a high level signal at its output terminal $\overline{Q}$ in response to the latch signal $d_i$. In response to the high level signal from D-flip flop 175, D-flip flop 178 produces a low level signal therefrom in response to the latch signal $d_i$. In other words, the binary signal from counters 172 and 173 is latched and produced by the latch circuit 176, 177 as a binary signal v in response to the latch signal $d_i$, and the high and low level signals from D-flip flop 175 are respectively inverted and produced by D-flip flop 178 as sign signals $v_1$ each having low and high levels in response to the latch signal $d_i$.

From the above description, it will be clearly recognized that a vehicle speed $V_s$ satisfies the following equation (1) in relation to the period of time $T_i$ of gate signal $b_i$ from timing signal generator 130.

$$T_i = \beta / V_s \tag{1}$$

where the character $\beta$ indicates a constant. Assuming that the vehicle command-speed upon closing of the set switch 40 is $V_{so}$ and that an actual vehicle speed is $(V_{so} - \Delta V_s)$, a time difference $\Delta T$ is represented by the following equation (2).

$$T = \beta \left( \frac{1}{V_{so} - \Delta V_s} - \frac{1}{V_{so}} \right) = \frac{\beta \Delta V_s}{(V_{so} - \Delta V_s) V_{so}} \tag{2}$$

-continued $$\approx \frac{\beta \Delta V_s}{V_{so}} \quad (V_{so}^2 >> \Delta V_s V_{so})$$

where the character $\Delta V_s$ indicates a difference between the command-speed $V_{so}$ and the actual speed. This means that the time difference $\Delta T$ is substantially proportional to the speed difference $\Delta V_s$. Consequently, it should be understood that the binary signal v from the latch circuits 176, 177 indicates the time difference $\Delta T$ corresponding with the speed difference $\Delta V_s$.

Figure 8:
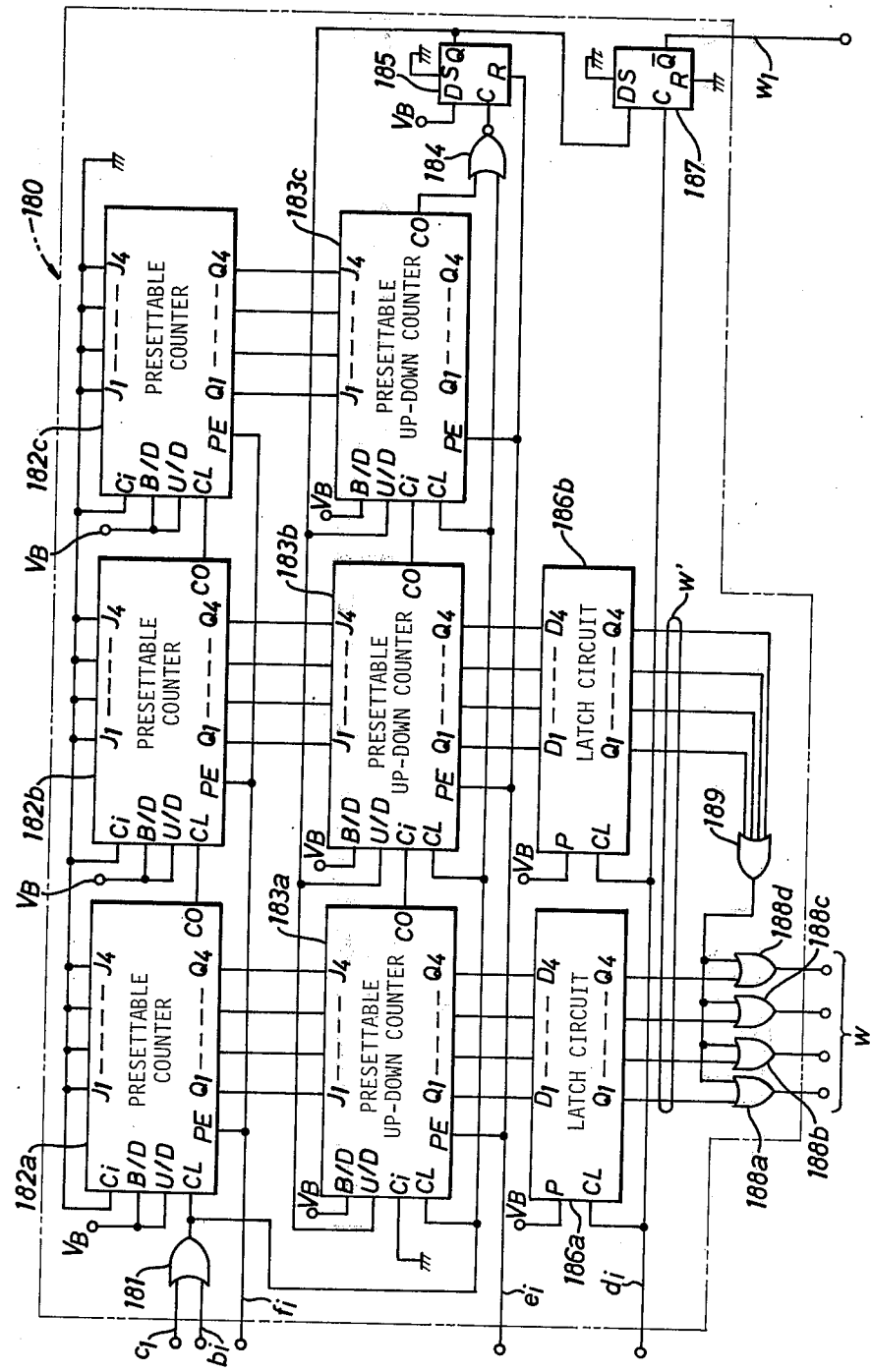
FIG. 8 is a circuit diagram of a preferred embodiment of the acceleration calculation circuit shown in block form in FIG. 1.

FIG. 8 illustrates a preferred embodiment of the acceleration calculation circuit 180 which includes presettable up-down counters 182a, 182b and 182c controlled by an OR-gate 181 and the timing signal generator 130. OR-gate 181 acts to produce a high level signal in responce to the gate and clock signals $b_i$ and $C_1$. When the gate signal $b_i$ is at a low level, OR-gate 181 receives the clock signals $C_1$ to produce the same therefrom. The presettable up-down counters 182a, 182b and 182c are respectively of CD 4029 type manufactured by RCA Corporation. Each of the counters 182a, 182b and 182c is provided with input terminals B/D and U/D respectively for receiving DC voltage $V_B$ from the vehicle battery and with jam input terminals $J_1$ to $J_4$ grounded. This means that each of the counters 182a, 182b and 182c serves to function as a fourbit up counter. The counter 182a is provided with a clock terminal CL for receiving the high level signal or first clock signals $C_1$ from OR-gate 181 and a preset-enable terminal PE for receiving the reset signal $f_i$ from timing signal generator 130. Upon receiving the reset signal $f_i$, the counter 182a is reset to produce low level signals at its carry-out and output terminals CO and $Q_1$ to $Q_4$. At the trailing edge of reset signal $f_i$, the counter 182a is released from its reset condition and starts to count a series of the first clock signals $C_1$ from OR-gate 181 so as to produce a high level signal at its carry-out terminal CO. When a value counted in the counter 182a reaches the maximum value, the counter 182a produces output signals indicative of the maximum value at its output terminals $Q_1$ to $Q_4$ and produces a low level signal at its carry-out terminal CO. The operation of counter 182a is repeated during generation of a series of the first clock signals $C_1$ from OR-gate 181 and stopped in response to the high level signal from OR-gate 181.

The presettable counter 182b is provided with a clock terminal CL for receiving the high or low level signal from the carry-out terminal CO of counter 182a and a preset-enable terminal PE for receiving the reset signal $f_i$ from timing signal generator 130. Upon receiving the reset signal $f_i$, the counter 182b is reset to produce low level signals at its carry-out and output terminals CO and $Q_1$ and $Q_4$. At the trailing edge of reset signal $f_i$, the counter 182b is released from its reset condition and starts to count a series of the high level signals from counter 182a so as to produce a high level signal at its carry-out terminal CO. When a value counted in the counter 182b reaches the maximum value, the counter 182b produces output signals indicative of the maximum value at its output terminals $Q_1$ to $Q_4$ and produces a low level signal at its carry-out terminal CO. The operation of counter 182b is repeated during generation of a series of the high level signals from counter 182a and stopped when operation of counter 182a is stopped.

The presettable counter 182c is provided with a clock terminal CL for receiving a series of the high level signals from the carry-out terminal CO of counter 182b and a preset-enable terminal PE for receiving the reset signal $f_i$ from timing signal generator 130. Upon receiving the reset signal $f_i$, the counter 182c is reset to produce low level signals at its output terminals $Q_1$ to $Q_4$. At the trailing edge of reset signal $f_i$, the counter 182c is released from its reset condition and counts a series of the high level signals from counter 182b to produce output signals at its output terminals $Q_1$ to $Q_4$. When the counting operation of the counter 182c is completed, all the output signals from counters 182a to 182c are respectively latched and applied to presettable up-down counters 183a to 183c as a binary signal indicative of the period of time $T_i$ of gate signal $b_i$.

The acceleration calculation circuit 180 also includes a NOR-gate 184 which is controlled by OR-gate 181 and counter 183c. NOR-gate 184 produces a low level signal in response to the high level signal from a carry-out terminal CO of counter 183c. NOR-gate 184 produces a high level signal in response to the low level signals from OR-gate 181 and counter 183c. The low or high level signals from NOR-gate 184 are applied to a D-flip flop 185. D-flip flop 185 is provided with an input terminal D for receiving DC voltage $V_B$ from the vehicle battery and a clock terminal C for receiving the low or high level signals from NOR-gate 184. D-flip flop 185 is also provided with a reset terminal R for receiving the preset signal $e_i$ from timing signal generator 130. Upon receiving the preset signal $e_i$, D-flip flop 185 is reset to produce a low level signal at its output terminal Q in response to the high level signal from NOR-gate 184. At the trailing edge of preset signal $e_i$, D-flip flop 185 is released from its reset condition and produces a high level signal in response to the low level signal from NOR-gate 184.

The presettable up-down counters 183a, 183b and 183c are respectively of CD 4029 type manufactured by RCA Corporation. The counter 183a is provided with jam input terminals $J_1$ to $J_4$ for respectively receiving the output signals from counter 182a and with input terminals B/D and U/D for respectively receiving DC voltage $V_B$ from the vehicle battery and the low or high level signal from D-flip flop 185. The counter 183a is also provided with a clock terminal CL connected to OR-gate 181 and a presetenable terminal PE for receiving the preset signal $e_i$ from timing signal generator 130, a carry-in terminal of counter 183a being grounded. Upon receiving the signal $e_i$, the counter 183a is preset to receive therein the output signals from counter 182a and to produce a high level signal at its carry-out terminal CO. At the trailing edge of preset signal $e_i$, the counter 183a is released from its preset condition and starts to count down the output signals from counter 182a in accordance with a series of the clock signals $C_1$ from OR-gate 181 during generation of the low level signal from D-flip flop 185. The counter 183a is maintained to produce the high level signal during its count-down operation and produces a low level signal at its carry-out terminal CO when a value counted down in counter 183a reaches zero. This count-down operation in counter 183a is repeated to alternatively produce high and low level signals from the carry-out terminal CO of counter 183a.

In case the count-down operation in counter 183a is completed during generation of the low level signal from D-flip flop 185, the counter 183a produces output signals at its output terminals $Q_1$ to $Q_4$ upon completion of its count-down operation. In case the high level signal appears from D-flip flop 185, the counter 183a starts to count up the remaining first clock signals $C_1$ from OR-gate 181 so as to produce a high level signal at its carry-out terminal CO. Then, the counter 183a is maintained to produce the high level signal therefrom during its count-up operation and produces a low level signal at its carry-out terminal CO when a value counted up in counter 183a reaches the maximum value. This count-up operation in counter 183a is repeated to alternatively produce high and low level signals from the carry-out terminal CO of counter 183a and is stopped in response to the high level signal from OR-gate 181. Upon completion of the count-up operation, the counter 183a produces output signals at its output terminals $Q_1$ to $Q_4$.

The presettable up-down counter 183b is provided with jam input terminals $J_1$ to $J_4$ for receiving the output signals from counter 182b and a carry-in terminal $C_i$ for receiving the high or low level signals from counter 183a, the other constructions of counter 183b being the same as those of the counters 183a. Upon receiving the preset signal $e_i$ from timing signal generator 130, the counter 183b is preset to receive therein the output signals from counter 182b. The count-down operation of counter 183b is inhibited due to the high level signal from counter 183a, and the counter 183b produces a high level signal at its carry-out terminal CO. In response to the low level signal from counter 183a, the counter 183b starts to count down the output signals from counter 182b in accordance with a series of the first clock signals $C_1$ from OR-gate 181 during generation of the low level signal from D-flip flop 185. This count-down operation in counter 183b is repeated in response to each low level signal from counter 183a to alternatively produce high and low level signals from the carry-out terminal CO of counter 183b. In case the count-down operation in counter 183b is completed during generation of the low level signal from D-flip flop 185, the counter 183b produces output signals at its output terminals $Q_1$ to $Q_4$. In case the high level signal appears from D-flip flop 185, the counter 183b starts to repetitively count up the remaining first clock signals $C_1$ from OR-gate 181 in response to each low level signal from counter 183a and to alternatively produce high and low level signals at its carry-out terminal CO. Upon completion of the count-up operation, the counter 183b produces output signals at its output terminals $Q_1$ to $Q_4$.

The presettable up-down counter 183c is provided with jam input terminals $J_1$ to $J_4$ for receiving the output signals from counter 182c and a carry-in terminal $C_i$ for receiving the high or low level signals from counter 183b, the other constructions of counter 183c being the same as those of the counter 183a. In response to the preset signal $e_i$, the counter 183c is preset to receive therein the output signals from counter 182c. The count-down operation of counter 183c is inhibited due to the high level signal from counter 183b. Upon receiving the low level signal from counter 183b, the counter 183c starts to count down the output signals from counter 182c in accordance with a series of the first clock signals $C_1$ from OR-gate 181 during generation of the low level signal from D-flip flop 185. This count-down operation in counter 183c is conducted in response to each low level signal from counter 183b.

In summary, when a period of time represented by the binary signal from counter 182a to 182c is shorter than the total period of time of a series of the first clock signals $C_1$ issued from OR-gate 181 within the period of time $T_i$ of gate signal $b_i$, all the counters 183a to 183c count down the value of the binary signal from counter 182a to 182c in accordance with a series of the first clock signals $C_1$ during generation of the low level signal from D-flip flop 185. Subsequently, the counters 183a, 183b and 183c count up the remaining first clock signals $C_1$ in response to the high level signal from D-flip flop 185 in such a manner that output signals are produced from counters 183a, 183b as a binary signal indicative of an absolute value of a time difference between the value of the binary signal from counters 182a to 182c and the total period of time of the first clock signals $C_1$, the time difference having a negative sign defined by the high level signal from D-flip flop 185. In case a period of time represented by the binary signal from counters 182a to 182c is longer than the total period of time of the first clock signals $C_1$, it is counted down by the counters 183a to 183c in accordance with a series of the first clock signals $C_1$ during generation of the low level signal from D-flip flop 185. Then, the counter 183a, 183b produce output signals therefrom as a binary signal indicative of an absolute value of another time difference between the value of the binary signal from counters 182a to 182c and the total period of time of the first clock signals $C_1$, the other time difference having a positive sign defined by the low level signal from D-flip flop 185.

The acceleration calculation circuit 180 further includes a pair of latch circuits 186a and 186b which are controlled by the timing signal generator 130. The latch circuit 186a latches therein the output signals from counter 183a in response to the latch signal $d_i$ from timing signal generator 130 to produce the same at its output terminals $Q_1$ to $Q_4$, and the latch circuit 186b latches therein the output signals from counter 183b in response to the latch signal $d_i$ to produce the same at its output terminals $Q_1$ to $Q_4$. A D-flip flop 187 is provided with an input terminal D for receiving the low or high level signal from D-flip flop 185 and a clock terminal C for receiving the latch signal $d_i$ from timing signal generator 130. D-flip flop 187 produces a high level signal at its output terminal $\overline{Q}$ in response to the latch signal $d_i$ and the low level signal from D-flip flop 185. D-flip flop 187 also produces a low level signal in response to the latch signal $d_i$ and the high level signal from D-flip flop 185. In other words, the binary signal from counters 183a, 183b is latched and produced by the latch circuits 186a, 186b as a binary signal w' in response to the latch signal $d_i$, and the high or low level signal from D-flip flop 185 is inverted and produced by D-flip flop 187 as a sign signal $w_1$ of low or high level in response to the latch signal $d_i$.

In this embodiment, the acceleration calculation circuit 180 is characterized by provision of five OR-gates 188a, 188b, 188c, 188d and 189 for receiving the binary signal w' from latch circuits 186a and 186b. In case a value of the binary signal w' is less than fifteen (15) in decimal notation, OR-gates 188a to 188d permit to produce the same binary signal w' as a binary signal w. If a value of the binary signal w' is more than sixteen (16) in decimal notation, OR-gate 189 serves to produce a binary signal indicative of fifteen (15) through OR-gates 188a to 188d. The limited value of fifteen indicates an acceleration of 0.02G at a vehicle speed of 40 km/h or an acceleration of 0.16G at a vehicle speed of 80 km/h.

Figure 9:
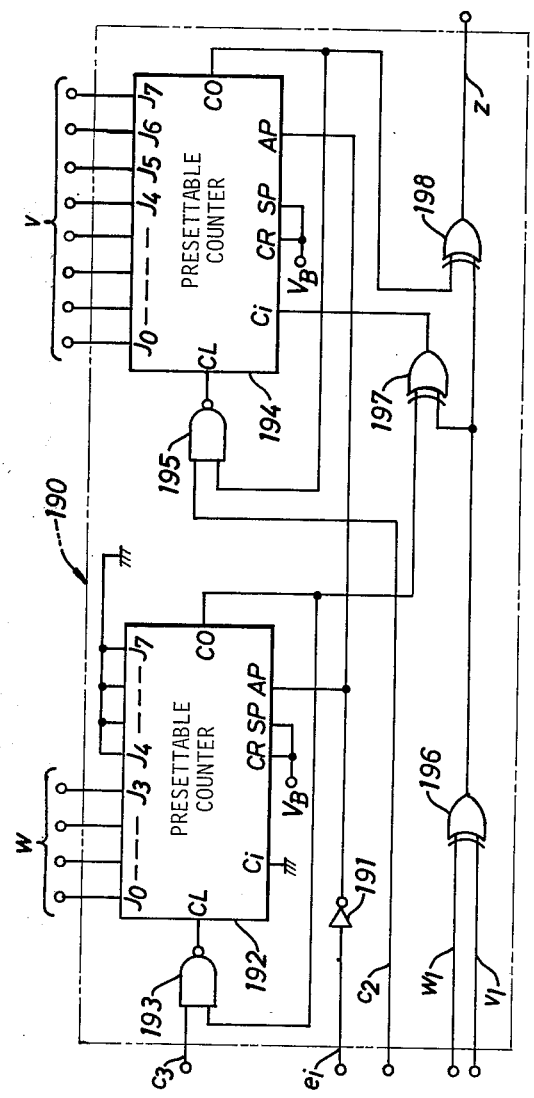
FIG. 9 is a circuit diagram of a preferred embodiment of the correction signal generator shown in block form in FIG. 1.

In FIG. 9, there is illustrated a preferred embodiment of the correction signal generator 190 which includes a presettable down counter 192 controlled by an inverter 191 and a NAND-gate 193. The inverter 191 acts to invert the preset signal $e_i$ from timing signal generator 130. NAND-gate 193 has input terminals for respectively receiving a series of the third clock signals $C_3$ from clock signal generator 110 and a low or high level signal from counter 192. NAND-gate 193 produces a pulse signal sequentially in response to each of the third clock signals $C_3$ during generation of the high level signal from the carry-out terminal CO of counter 192. In response to the low level signal from counter 192, NAND-gate 193 produces a high level signal at its output terminal.

The presettable down counter 192 is of CD 40103 type which is manufactured by RCA Corporation. The counter 192 is provided with jam input terminals $J_0$ to $J_3$ for receiving the binary signal w from OR-gates 188a to 188d of acceleration calculation circuit 180 and with an asynchronous preset-enable terminal AP for receiving a low level signal from inverter 191. The remaining jam input terminals $J_4$ to $J_7$ of counter 192 are grounded, and a carry-in terminal $C_i$ of counter 192 is also grounded. The counter 192 is further provided with a clock terminal CL for receiving the pulse signals or high level signals from NAND-gate 193 and with clear and synchronous preset-enable terminals CR and SP for receiving DC voltage $V_B$ from the vehicle battery. Upon receiving the binary signal w in response to the low level signal from inverter 191, the down counter 192 acts to preset therein the binary signal w. When the level of signal from inverter 191 becomes high, the counter 192 starts to count down a value of the binary signal w in accordance with a series of the pulse signals from NAND-gate 193. Then, the counter 192 produces a high level signal at its carry-out terminal CO during the count-down operation thereof. When the value of binary signal w is counted down to zero, the counter 192 produces a low level signal at its carry-out terminal CO, the count-down operation of counter 192 being stopped in response to the high level signal from NAND-gate 193. The above operation in counter 192 is repeated in response to each preset signal $e_i$ from timing signal generator 130 such that a high level signal with a width corresponding to the value of binary signal w is repetitively produced from the carry-out terminal CO of counter 192.

The correction signal generator 190 also includes an exclusive OR-gate 197 which is controlled by the counter 192 and an exclusive OR-gate 196. The exclusive OR-gate 196 has input terminals for respectively receiving the sign signals $v_1$ and $w_1$ from the speed-difference and acceleration calculation circuits 170 and 180. The exclusive OR-gate 196 produces a low level signal when both the sign signals $v_1$ and $w_1$ are at a low or high level. When one of the sign signals $v_1$ and $w_1$ is at a high level and the other sign signal is at a low level, the exclusive OR-gate 196 produces a high level signal. In other words, the exclusive OR-gate 196 produces the low level signal when each sign of the sign signals $v_1$ and $w_1$ is identical to each other. The exclusive OR-gate 196 also produces the high level signal when each sign of the sign signals $v_1$ and $w_1$ is opposite to each other. The exclusive OR-gate 197 has input terminals for receiving the high or low level signals from the down counter 192 and exclusive OR-gate 196. The exclusive OR-gate 197 produces a low level signal in response to the low or high level signals from the counter 192 and exclusive OR-gate 196. The low level signal from exclusive OR-gate 197 becomes high level when one of the counter 192 and exclusive OR-gate 196 produces a low level signal and the other produces a high level signal.

The correction signal generator 190 further includes a presettable down counter 194 which is controlled by the exclusive OR-gate 197 and a NAND-gate 195. NAND-gate 195 has input terminals for receiving a series of the second clock signals $C_2$ from clock signal generator 110 and a high or low level signal from counter 194. NAND-gate 195 produces a pulse signal sequentially in response to each of the second clock signals $C_2$ during generation of the high level signal from counter 194. When the high level signal from counter 194 becomes low level, NAND-gate 195 produces a high level signal therefrom.

The presettable down counter 194 is of CD 40103 type which is manufactured by RCA Corporation. The counter 194 is provided with jam input terminals $J_0$ to $J_7$ for receiving the binary signal v from the latch circuits 176, 177 and with an asynchronous preset-enable terminal AP for receiving the low level signal from inverter 191. The counter 194 is also provided with clock and carry-in terminals CL and $C_i$ for respectively receiving the pulse or high level signals from NAND-gate 195 and the low or high level signals from exclusive OR-gate 197 and is provided with clear and synchronous preset-enable terminals CR and SP for receiving DC voltage $V_B$ from the vehicle battery.

Upon receiving the binary signal v in response to the low level signal from inverter 191, the down counter 194 serves to preset therein the binary signal v, the counting operation of counter 194 being inhibited due to the high level signal from exclusive OR-gate 197. When each of the low and high level signals respectively from the inverter 191 and exclusive OR-gate 197 is inverted, the counter 194 starts to count down a value of the binary signal v sequentially in response to each of the pulse signals from NAND-gate 195. During the count-down operation, the counter 194 produces a high level signal at its carry-out terminal CO. When the value of the binary signal v is counted down to zero, the counter 194 produces a low level signal at its carry-out terminal CO, and the count-down operation of counter 194 is stopped in response to the high level signal from NAND-gate 195. The above operation of counter 194 is repeated in response to each preset signal $e_i$ from timing signal generator 130 and each low level signal from exclusive OR-gate 197 such that a high level signal with a width corresponding to the value of binary signal v is repetitively produced from the carry-out terminal CO of counter 194.

An exclusive OR-gate 198 has input terminals connected to counter 194 and exclusive OR-gate 196. The exclusive OR-gate 198 produces a low level signal in response to a low or high level signal from each of counter 194 and exclusive OR-gate 196. The exclusive OR-gate 198 also produces a high level signal in response to a low level signal from one of counter 194 and exclusive OR-gate 196 and a high level signal from the other one.

In summary, if the sign signals $v_1$ and $w_1$ have an identical sign to each other, the counting operation of counter 194 is inhibited under control of counter 192 and exclusive OR-gates 196, 197 so that the counter 194 produces the high level signal. Upon completion of the counting operation in counter 192, the counter 194 starts to count down the value of binary signal v in response to the low level signal from exclusive OR-gate 197 and continuously produces the high level signal.

After the count-down operation, the counter 194 produces the low level signal. Thus, the exclusive OR-gate 198 produces the high level signal as a correction signal z with a width $\tau$ corresponding to the sum of the values of binary signals v and w. If the sign signals $v_1$ and $w_1$ are opposite to each other, the counters 192, 194 simultaneously start to respectively count down the values of binary signals w and v upon appearance of the low level signals from inverter 191 and exclusive OR-gate 197. At this stage, the correction signal z from exclusive OR-gate 198 is at a low level due to the high level signals from counter 194 and exclusive OR-gate 196. In case the count-down operation of counter 194 is completed prior to that of counter 192, the counter 194 produces the low level signal upon completion of its count-down operation to make the correction signal z a high level signal. Thereafter, the counter 192 produces the low level signal upon completion of its count-down operation, and the counter 194 produces the high level signal due to the low and high level signals from counter 192 and exclusive OR-gate 197 to make the correction signal z a low level signal. This means that the width $\tau$ of the correction signal z corresponds with the difference between the values of binary signals w and v. Additionally, if the count-down operation in counter 192 is completed prior to that of counter 194, the correction signal z from exclusive OR-gate 198 does not appear due to the high level signals from counter 194 and exclusive OR-gate 196.

In FIG. 11, there are illustrated preferred embodiments of the distribution circuit 200, the initial setting signal generator 210 and the drive circuit 220. The initial setting signal generator 210 includes an inverter 213 and a pair of binary counters 211, 212. The inverter 213 acts to invert the operation signal m from control signal generator 140. The binary counter 211 is of CD 4520 type manufactured by RCA Corporation and is provided with a clock-enable terminal CE for receiving a series of the third clock signals $C_3$ from clock signal generator 110. The counter 211 is also provided with a reset terminal R for receiving the inverted output signal from inverter 213 and with a clear terminal C for receiving a high level signal from counter 212. Upon receiving the inverted output signal from inverter 213, the counter 211 is reset to produce a low level signal at its output terminal $Q_4$. When the inverted output signal from inverter 213 becomes low level, the counter 211 starts to count a series of the third clock signals $C_3$. When a value counted in counter 211 reaches a number of 16, the low level signal from counter 211 becomes high level. The counting operation of counter 211 is twice repeated to produce two high level signals in sequence, and it is stopped by the high level signal from counter 212.

The binary counter 212 is provided with a clock-enable terminal CE for receiving the high level signals from the output terminal $Q_4$ of counter 211, the other constructions of counter 212 being the same as those of counter 211. Upon receiving the inverted output signal from inverter 213, the counter 212 is reset to produce a low level signal at its output terminal $Q_2$. When the inverted output signal from inverter 213 becomes low level, the counter 212 starts to count the high level signals from counter 211. When a value counted in counter 211 reaches a number of 32, the counter 212 produces a high level signal at its output terminal $Q_2$. The counting operation of counter 212 is stopped by the high level signal from the output terminal $Q_2$. In other words, the high level signal from counter 212 produces at a lapse of time of about 0.5 seconds after start of the counting operation in counter 211. NOR-gate 214 has input terminals for receiving the inverted output signal from inverter 213 and the low or high level signal from the output terminal $Q_2$ of counter 212. NOR-gate 214 produces a high level signal in response to the low level signal from counter 212 when the inverted output signal from inverter 213 is at a low level. The high level signal from NOR-gate 214 is used to determine the opening degree of throttle valve 12 in the initial value corresponding to the command speed of the vehicle. When the low level signal from counter 212 becomes high level, NOR-gate 214 produces a low level signal at its output terminal. This means that the high level signal from NOR-gate 214 is applied to the distribution circuit 200 as an initial setting signal with a width defined by about 0.5 seconds.

The distribution circuit 200 comprises an AND-gate 202a which is controlled by an inverter 201 and the correction signal generator 190. The inverter 201 acts to invert the sign signal $w_1$ from acceleration calculation circuit 180. When the inverted output signal from inverter 201 is at a high level, AND-gate 202a produces a high level signal in response to the correction signal z from correction signal generator 190. When one of the correction signal z and the inverted output signal from inverter 201 is at a low level, AND-gate 202a produces a low level signal. An AND-gate 202b has input terminals for receiving the sign signal $w_1$ and the correction signal z. When the sign signal $w_1$ is at a high level, AND-gate 202b produces a high level signal in response to the correction signal z. When one of the sign and correction signals $w_1$ and z is at a low level, AND-gate 202b produces a low level signal.

NOR-gate 203a has input terminals for receiving the high or low level signal from AND-gate 202a and the acceleration signal n from control signal generator 140. NOR-gate 203a produces a low level signal in response to one of the acceleration signal n and the high level signal from AND-gate 202a. When each of the acceleration signal n and the high level signal from AND-gate 202a becomes low level, NOR-gate 203a produces a high level signal. Meanwhile, NOR-gate 203b has input terminals for receiving the low or high level signal from AND-gate 202b and the deceleration signal r from control signal generator 140. NOR-gate 203b produces a low level signal in response to one of the deceleration signal r and the high level signal from AND-gate 202b. When each of the deceleration signal r and the high level signal from AND-gate 202b becomes low level, NOR-gate 203b produces a high level signal.

The distribution circuit 200 further comprises NOR-gates 204a, 204b and AND-gates 205a, 205b. NOR-gate 204a produces a low level signal in response to one of the deceleration signal r and the high level signal from NOR-gate 203a. When each of the deceleration signal r and the high level signal from NOR-gate 203a becomes low level, NOR-gate 204a produces a high level signal. NOR-gate 204b produces a low level signal in response to one of the acceleration signal n and the high level signal from NOR-gate 203b. When each of the acceleration signal n and the high level signal from NOR-gate 203b becomes low level, NOR-gate 204b produces a high level signals.

AND-gate 205a has input terminals for receiving the operation signal m from control signal generator 140 and the high or low level signal from NOR-gate 204a.

AND-gate 205a produces a high level signal in response to the operation signal m and the high level signal from NOR-gate 204a. When one of the operation signal m and the high level signal from NOR-gate 204a becomes low level, AND-gate 205a produces a low level signal. AND-gate 205b has input terminals for receiving the operation signal m and the low or high level signal from NOR-gate 204b. AND-gate 205b produces a high level signal in response to the operation signal m and the high level signal from NOR-gate 204b. When one of the operation signal m and the high level signal from NOR-gate 204b becomes low level, AND-gate 205b produces a low level signal.

OR-gate 206 produces a high level signal as the first distribution signal in response to one of the high level signal from AND-gate 205a and the initial setting signal form NOR-gate 214. When each of the high level signal from AND-gate 205a and the initial setting signal from NOR-gate 214 becomes low level, OR-gate 206 produces a low level signal. AND-gate 208 is provided with input terminals for receiving the low or high level signal from AND-gate 205b and an output signal from an inverter 207. The inverter 207 acts to invert the initial setting signal from NOR-gate 214. When the inverted output signal from inverter 207 is at a high level, AND-gate 208 produces a high level signal as the second distribution signal in response to the high level signal from AND-gate 205b. When one of the inverted output signal from inverter 207 and the high level signal from AND-gate 205b becomes low level, AND-gate 208 produces a low level signal.

The drive circuit 220 is provided with a first transistor circuit 221 which includes three transistors $TR_1$, $TR_2$ and $TR_3$. The transistor $TR_3$ has a collector for receiving DC voltage $V_B$ from the vehicle battery and a base for receiving the release signal h from cancel switch 50 through a pair of diodes. The base of transistor $TR_3$ is connected through a resistor to the vehicle battery and also grounded through the diode and a resistor. The transistor $TR_3$ is turned on when the cancel switch 50 is opened. Upon appearance of the release signal h from cancel switch 50, the transistor $TR_3$ is turned off. The transistor $TR_1$ is provided with a collector for receiving DC voltage $V_B$ from the vehicle battery through a pair of resistors and the transistor $TR_3$ and with a base for receiving the operation signal m from control signal generator 140 through a resistor, the base of transistor $TR_1$ being grounded through another resistor. During conduction of the transistor $TR_3$, the transistor $TR_1$ is turned on in response to the operation signal m. When the transistor $TR_3$ becomes non-conductive, the transistor $TR_1$ is turned off. The transistor $TR_1$ is also turned off when the operation signal m becomes low level.

The transistor $TR_2$ is provided with an emitter for receiving DC voltage $V_B$ from the vehicle battery through the transistor $TR_3$ and with a collector connected to the solenoid 26a of solenoid valve 26. The base of transistor $TR_2$ is connected to the vehicle battery through the resistor and transistor $TR_3$ and is also grounded through the resistor and transistor $TR_1$. During conduction of transistor $TR_3$, the transistor $TR_2$ is turned on in response to conduction of transistor $TR_1$ to produce a high level signal as the first output signal at its collector. When one of the transistors $TR_1$, $TR_3$ is turned off, the first output signal from transistor $TR_2$ becomes low level. From the above-description, it will be understood that all the transistors $TR_1$ to $TR_3$ are turned on in response to the operation signal m under opening of the cancel switch 50 to produce the first output signal from the transistor $TR_2$. The transistor $TR_1$ to $TR_3$ are also turned off in response to the release signal h from cancel switch 50 to make the first output signal a low level signal. When the operation signal m becomes low level, the transistor $TR_1$ to $TR_3$ are also turned off to make the first output signal a low level signal.

The drive circuit 220 is further provided with second and third transistor circuits 222 and 223 which are controlled by the distribution circuit 200. The second transistor circuit 222 includes a transistor $TR_4$ which has a base for receiving the low or high level signal from AND-gate 208 through a resistor, the base of transistor $TR_4$ being grounded through a resistor. The transistor $TR_4$ also has a collector for receiving DC voltage $V_B$ from the vehicle battery through a pair of resistors. The transistor $TR_4$ is turned on in response to the high level or second distribution signal from AND-gate 208 and is turned off in response to the low level signal from AND-gate 208. A transistor $TR_5$ has an emitter for receiving DC voltage $V_B$ from the vehicle battery and a collector connected to the solenoid 27a of valve 27. The transistor $TR_5$ is also provided with a base for receiving DC voltage $V_B$ from the vehicle battery through the resistor, the base of transistor $TR_5$ being grounded through the resistor and transistor $TR_4$. The transistor $TR_5$ is turned on due to conduction of transistor $TR_4$ to produce a high level signal as the second output signal at its collector. The transistor $TR_5$ is also turned off due to non-conduction of transistor $TR_4$ to make the second output signal a low level signal.

The third transistor circuit 223 includes a transistor $TR_6$ which has a base for receiving the low or high level signal from OR-gate 206 through a resistor, the base of transistor $TR_6$ being grounded through a resistor. The transistor $TR_6$ has a collector for receiving DC voltage $V_B$ from the vehicle battery through a pair of resistors. The transistor $TR_6$ is turned on in response to the high level or first distribution signal from OR-gate 206 and is turned off in response to the low level signal from OR-gate 206. A transistor $TR_7$ is provided with an emitter for receiving DC voltage $V_B$ from the vehicle battery and a collector connected to the solenoid 28a of valve 28. The transistor $TR_7$ is also provided with a base for receiving DC voltage $V_B$ from the vehicle battery through the resistor, the base of transistor $TR_7$ being grounded through the resistor and transistor $TR_6$. The transistor $TR_7$ is turned on due to conduction of transistor $TR_6$ to produce a high level signal as the third output signal at its collector. The transistor $TR_7$ is also turned off due to non-conduction of transistor $TR_6$ to make the first output signal a low level signal.

OPERATION

When the vehicle starts to travel on a flat road upon depression of an accelerator pedal (not shown) and the speed control system is ready for its operation, the solenoid valve 26 opens to permit supply of the atmospheric pressure into the servo-chamber 23 of servomotor 20 through conduit $P_1$. Meanwhile, the solenoid valve 27 closes to block supply of the atmospheric pressure into the servo-chamber 23 through conduit $P_2$, and the solenoid valve 28 closes to block supply of the negative pressure from the induction passage 11 into the servo-chamber 23 through conduit $P_3$.

At this stage, the clock signal generator 110 produces each series of the first, second and third clock signals $C_1$, $C_2$ and $C_3$, and simultaneously the speed sensor 30 produces a series of electric signals at a frequency proportional to the actual speed of the vehicle. Each of the electric signals from speed sensor 30 is reshaped by wave shaper 120 and then applied to timing signal generator 130 as a rectangular pulse signal a (see FIG. 3). Then, the counter 132 of timing signal generator 130 is repetitively reset in response to each high level signal from RS-flip flop 131 and counts a series of the pulse signals a to repetitively produce a gate signal $b_i$ with a period of time $T_i$. Each gate signal $b_i$ is sequentially applied to D-flip flop 133, cancellation circuit 150, command-speed set circuit 160 and acceleration calculation circuit 180. Subsequently, D-flip flop 133 is reset by each high level signal from RS-flip flop 131 to repetitively produce a high level signal at its output terminal Q. The counter 134 is reset by each high level signal from RS-flip flop 131 and counts a series of the first clock signals $C_1$ under generation of each high level signal from D-flip flop 133 to repetitively produce latch, preset and reset signals $d_i$, $e_i$ and $f_i$ in sequence.

When the set switch 40 is temporarily closed at a desired or command speed of the vehicle, a set signal c is produced from set switch 40 and applied to control signal generator 140 (see FIGS. 1 and 4). Then, NAND-gate 141 of control signal generator 140 produces a high level signal in response to the set signal c so that RS-flip flop 142 produces a low level signal $i_1$ to be applied to D-flip flop 143a. Assuming that immediately after closing the set switch 40, the timing signal generator 130 produces a gate signal $b_1$ with a period of time $T_1$ and produces latch, preset and reset signals $d_1$, $e_1$ and $f_1$ in sequence, as previously described, the gate signal $b_1$ is applied to cancellation circuit 150, command-speed set circuit 160 and acceleration calculation circuit 180, and the latch signal $d_1$ is applied to control signal generator 140, cancellation circuit 150, speed-difference and acceleration calculation circuits 170 and 180. The preset signal $e_1$ is also applied to control signal generator 140, speed-difference and acceleration calculation circuits 170 and 180 and correction signal generator 190, and the reset signal $f_1$ is further applied to control signal generator 140, cancellation circuit 150, command-speed set circuit 160 and acceleration calculation circuit 180.

When D-flip flop 143a of control signal generator 140 receives the preset and low level signals $e_1$, $i_1$ respectively from timing signal generator 130 and RS-flip flop 142 after reset by the power-on reset circuit 145a, it produces a command-speed signal $j_1$ (see FIG. 5) which is applied to D-flip flop 143b and the command-speed set circuit 160. Then, the low level signal $i_1$ from RS-flip flop 142 becomes a high level signal $i_2$ in response to the reset signal $f_1$ from timing signal generator 130. Simultaneously, the binary counter 153 of cancellation circuit 150 is reset by the reset signal $f_1$ and starts to count a series of the first clock signals $C_1$ through NOR-gate 151, 152 at a trailing edge of gate signal $b_1$. In the command-speed set circuit 160, the counters 164, 165 and 166 are simultaneously reset by AND-gate 163 in response to the reset and command-speed signals $f_1$ and $j_1$ and start to count a series of the first clock signals $C_1$ through NOR-gate 161 and AND-gate 162 within a width of the command-speed signal $j_1$, as previously described. In the acceleration calculation circuit 180, the counters 182a, 182b and 182c are also simultaneously reset by the reset signal $f_1$ and start to count a series of the first clock signals $C_1$ through OR-gate 181 at the trailing edge of gate signal $b_1$.

When a gate signal $b_2$ with the same period of time as that of gate signal $b_1$ and latch, preset and reset signals $d_2$, $e_2$ and $f_2$ following the gate signal $b_1$ are sequentially produced from timing signal generator 130, each counting operation in counters 153, 164 to 166 and 182a to 182c of circuits 150, 160 and 180 is completed at a leading edge of gate signal $b_2$. Then, the counter 153 produces high level signals at its output terminals $Q_9$, $Q_{10}$, and AND-gate 155 produces a high level signal in response to the high level signal from counter 153 to generate a high level signal from D-flip flop 156. The counters 164 to 166 produce a binary signal u indicative of the period of time $T_1$ of gate signal $b_1$ upon completion of the counting operation, the binary signal u being applied to the speed-difference calculation circuit 170. The counters 182a to 182c also produce a binary signal indicative of the period of time $T_1$ of gate signal $b_1$ upon completion of the counting operation to apply the same to the up-down counters 183a to 183c. When D-flip flop 143b of control signal generator 140 receives the latch signal $d_2$ from timing signal generator 130 after reset by the power-on reset circuit 145a, the command-speed signal $j_1$ is inverted by D-flip flop 143b and applied to D-flip flop 143c as a low level signal k (see FIG. 5). In the cancellation circuit 150, the high level signal from D-flip flop 156 is latched by D-flip flop 157 in response to the latch signal $d_2$ and inverted as a low level signal to be applied to control signal generator 140. This means that a release signal s from cancellation circuit 150 is applied as the low level signal to control signal generator 140 for maintaining operation of the speed control system.

When the preset signal $e_2$ from timing signal generator 130 is applied to D-flip flop 143a of control signal generator 140, the command-speed signal $j_1$ is inverted by D-flip flop 143a into a low level signal. At this stage, the binary signal u is still stored in the presettable up counters 164 to 166 of command-speed set circuit 160. When the preset signal $e_2$ from timing signal generator 130 is applied to speed-difference and acceleration calculation circuits 170 and 180, the up-down counters 171 to 173 of calculation circuit 170 preset therein the binary signal u from command-speed set circuit 160 and start to count down the value of binary signal u at a trailing edge of gate signal $b_2$ in accordance with a series of the first clock signals $C_1$ from NOR-gate 161. Simultaneously, the up-down counters 183a to 183c of calculation circuit 180 preset therein the binary signal from counters 182a to 182c and start to count down the value of the same binary signal at the trailing edge of gate signal $b_2$ in accordance with a series of the first clock signals $C_1$. When the gate and reset signals $b_2$ and $f_2$ from timing signal generator 130 are applied to cancellation circuit 150 and acceleration calculation circuit 180, each of the counters 153 and 182a to 182c is reset by the reset signal $f_2$ and again starts to count a series of the first clock signals $C_1$ at the trailing edge of gate signal $b_2$.

When a gate signal $b_3$ with the same period of time as that of gate signal $b_1$ and latch, preset and reset signals $d_3$, $e_3$ and $f_3$ following the gate signal $b_2$ are sequentially produced from timing signal generator 130, as previously described, each counting operation in counters 153 and 171 to 173 of circuits 150 and 170 is completed at a leading edge of gate signal $b_3$, and simultaneously each counting operation in counters 182a to 182c and 183a to 183c of circuit 180 is completed. Then, the counter 153 again produces high level signals at its output terminals $Q_9$, $Q_{10}$ upon completion of the counting operation to generate a high level signal from D-flip flop 156 under control of AND-gate 155. The counters 172 and 173 produce a binary signal indicative of zero value upon completion of the counting operation to apply the same to the latch circuits 176 and 177. Furthermore, the counters 182a to 182c again produce another binary signal indicative of the period of time of gate signal $b_2$ upon completion of the counting operation to apply the same to the up-down counters 183a to 183c, and the counters 183a and 183b produce a binary signal indicative of zero value upon completion of the counting operation to apply the same to the latch circuits 186a and 186b.

When the latch signal $d_3$ from timing signal generator 130 is applied to control signal generator 140 and cancellation circuit 150, the low level signal k is inverted by D-flip flop 143b into a high level signal which is applied to D-flip flop 143c. Then, D-flip flop 143c produces an operation signal m in response to the high level signal from D-flip flop 143b after reset by OR-gate 145. The operation signal m is then applied to distribution circuit 200, initial setting signal generator 210 and drive circuit 220. In this instance, D-flip flop 157 of cancellation circuit 150 again produces a low level signal in response to the latch signal $d_3$. When the latch signal $d_3$ is also applied to speed-difference and acceleration calculation circuits 170 and 180, the binary signal from counters 172, 173 is latched by latch circuits 176, 177 and applied to correction signal generator 190 as a binary signal v indicative of the zero value. Simultaneously, the binary signal from counters 183a, 183b is latched by latch circuits 186a, 186b and applied through OR-gates 188a to 188d and 189 to correction signal generator 190 as a binary signal w indicative of the zero value.

When the operation signal m from control signal generator 140 is applied to the initial setting signal generator 210 and to the distribution and drive circuits 200 and 220, the transistors $TR_1$ and $TR_3$ of drive circuit 220 are turned on so that a first output signal is produced from transistor $TR_2$ and applied to the solenoid 26a of valve 26. Simultaneously, the counters 211, 212 of signal generator 120 are reset by inverter 213 in response to the operation signal m and starts to count a series of the third clock signals $C_3$ from clock signal generator 110. Then, NOR-gate 214 of signal generator 210 produces an initial setting signal under control of inverter 213 in response to the operation signal m. The initial setting signal from NOR-gate 214 is applied as a first distribution signal to the third transistor circuit 223 of drive circuit 220 through OR-gate 206 of distribution circuit 200. Thus, the transistors $TR_6$, $TR_7$ are turned on due to the first distribution signal from OR-gate 206 so that a third output signal is produced from transistor $TR_7$ and applied to the solenoid 28a of valve 28.

When the solenoids 26a and 28a are energized by the first and third output signals from transistors $TR_2$ and $TR_7$, the solenoid valve 26 is closed to block supply of the atmospheric pressure into the servo-chamber 23 of servomotor 20, whereas the solenoid valve 28 is opened to permit supply of negative pressure from the induction passage 11 into the servo-chamber 23. This means that the servo-chamber 23 is supplied with negative pressure from the induction passage 11 in accordance with rotational speed of the engine. Thus, the diaphragm 22 of servomotor 20 is displaced downward against the resilient force of spring 25 to open the throttle valve 12. At this stage, the correction signal generator 190 produces a low level signal due to each zero value of the binary signals v and w to generate a low level signal respectively from AND-gates 205a, 208 of distribution circuit 200. Thus, the solenoid 27a of solenoid valve 27 is maintained in its deenergization under control of the second transistor circuit 222 of drive circuit 220 in response to the low level signal from AND-gate 208.

When the value counted in counters 211, 212 reaches the number of 32, the counter 212 produces a high level signal to make the initial setting signal from NOR-gate 214 a low level signal. Then, the transistors $TR_6$, $TR_7$ are turned off by OR-gate 206 in response to the low level signals from AND-gate 205a and NOR-gate 214 so that the solenoid valve 28 is closed due to deenergization of solenoid 28a to block the supply of negative pressure from induction passage 11 into servo-chamber 23. Thus, the displacement of diaphragm 22 in servomotor 20 is ceased to maintain the opening angle of throttle valve 12 in an initial value. This means that the initial throttle opening angle is maintained by an amount of negative pressure applied into servo-chamber 23 within a time defined by the width of the initial setting signal. Thereafter, the above operation of the speed control system is sequentially conducted to maintain the actual vehicle speed at the command or desired speed.

When loads against the vehicle increase under such a condition as described above, the actual speed of the vehicle starts to decrease. Then, the decrease of the vehicle speed is detected by speed sensor 30 to produce a series of electric signals at a frequency proportional to the decrease of the vehicle speed. Each of the electric signals from speed sensor 30 is reshaped by wave shaper 120 and sequentially applied to timing signal generator 130 as a rectangular pulse signal a. When the timing signal generator 130 produces a gate signal $b_m$ with a period of time $T_m$ and produces latch, preset and reset signals $d_m$, $e_m$ and $f_m$ in sequence, as previously discribed, the gate signal $b_m$ is applied to cancellation circuit 150, command-speed set circuit 160 and acceleration calculation circuit 180, and the latch signal $d_m$ is applied to control signal generator 140 and circuits 150, 170, 180. The preset signal $e_m$ is also applied to control and correction signal generators 140, 190 and calculation circuits 170, 180, and the reset signal $f_m$ is applied to control signal generator 140 and circuits 150, 160 and 180. In this instance, the period of time $T_m$ of gate signal $b_m$ is longer than the period of time $T_1$ of gate signal $b_1$. The period of time $T_m$ is assumed to be longer than a period of time $T_{m-1}$ of a gate signal $b_{m-1}$ prior to the gate signal $b_m$.

When the preset signal $e_m$ from timing signal generator 130 is applied to the speed-difference and acceleration calculation circuits 170, 180, the counters 171 to 173 of calculation circuit 170 preset therein the binary signal u from command-speed set circuit 160 and start to count down the value of binary signal u at a trailing edge of gate signal $b_m$ in accordance with a series of the first clock signals $C_1$. Simultaneously, the counters 183a to 183c of calculation circuit 180 preset therein a binary signal indicative of the period of time $T_{m-1}$ of gate signal $b_{m-1}$, which was previously issued from timing signal generator 130. Then, the counters 183a to 183c start to count down the period of time $T_{m-1}$ of the same binary signal at the trailing edge of gate signal $b_m$ in accordance with a series of the first clock signals $C_1$.

When the reset signal $f_m$ from timing signal generator 130 is applied to acceleration calculation circuit 180, the counters 182a to 182c start to count a series of the first clock signals $C_1$ at the trailing edge of gate signal $b_m$. In this instance, the control signal generator 140 continuously produces the operation signal m, and the calculation circuit 150 also produces the low level signal.

When each of the counters 173 and 183c produces a low level signal at its carry-out terminal CO upon completion of each count-down operation in counters 171 to 173 and 183a to 183c, D-flip flop 175 of calculation circuit 170 produces a high level signal under control of NOR-gate 174 in response to the low level signal from counter 173. D-flip flop 185 of calculation circuit 180 also produces a high level signal under control of NOR-gate 184 in response to the low level signal from counter 183c. Upon receiving the high level signals from D-flip flops 175 and 185 respectively, the counters 171 to 173 and 183a to 183c start to count up the remaining first clock signals $C_1$ defined by the period of time $T_m$ of gate signal $b_m$. Simultaneously, the high level signals from D-flip flops 175 and 185 are respectively applied to C-flip flops 178 and 187.

Sequentially, when a gate signal $b_{m+1}$ with a period fo time $T_{m+1}$ and latch, preset and reset signals $d_{m+1}$, $e_{m+1}$ and $f_{m+1}$ following the gate signal $b_m$ are produced from timing signal generator 130, each count-up operation of the counters 171 to 173 and 183a to 183c is completed at a leading edge of gate signal $b_{m+1}$. Then, a binary signal indicative of a first time difference $|T_1 - T_m|$ is produced from counters 172, 173 and applied to latch circuits 176, 177. This means that the binary signal from counters 172, 173 is applied to latch circuits 176, 177 as a binary signal indicative of the actual speed difference of the vehicle corresponding with the first time difference $|T_1 - T_m|$. Simultaneously, a binary signal indicative of a second time difference $|T_{m-1} - T_m|$ is produced from counters 183a, 183b and applied to latch circuits 186a, 186b. This means that the binary signal from counters 183a, 183b is applied to latch circuits 186a, 186b as a binary signal indicative of the actual acceleration of the vehicle corresponding with the second time difference $|T_{m-1} - T_m|$. Subsequently, the binary signal from counters 172, 173 is latched by latch circuits 176, 177 and applied as a binary signal v to the correction signal generator 190 in response to the latch signal $d_{m+1}$, and simultaneously the high level signal from D-flip flop 175 is inverted by D-flip flop 178 and applied to the correction signal generator 190 as a sign signal $v_1$ of low level or negative sign. The binary signal from counters 183a, 183b is also latched and applied by latch circuits 186a, 186b through OR-gates 188a to 188d and 189 to the correction signal generator 190 as a binary signal w in response to the latch signal $d_{m+1}$, and simultaneously the high level signal from D-flip flop 185 is inverted by D-flip flop 187 and applied to the correction signal generator 190 and distribution circuit 200 as a sign signal $w_1$ of low level or negative sign.

When the preset signal $e_{m+1}$ from timing signal generator 130 is applied to the correction signal generator 190, the down counters 192 and 194 preset respectively therein the binary signals w and v under control of inverter 191. Then, the counter 192 starts to count down a value of the binary signal w in accordance with a series of the third clock signals $C_3$ through NAND-gate 193 so as to produce a high level signal at its carry-out terminal CO. Simultaneously, the exclusive OR-gate 196 produces a low level signal in response to the sign signals $v_1$ and $w_1$ from calculation circuits 170 and 180. Thus, the exclusive OR-gate 197 produces a high level signal in response to the high and low level signals from counter 192 and exclusive OR-gate 196 so that the counter 194 is inhibited in its count-down operation to produce a high level signal at its carry-out terminal. As a result, a correction signal z is produced from the exclusive OR-gate 198 in response to the high and low level signals from counter 194 and exclusive OR-gate 196 and then applied to the distribution circuit 200.

When the distribution circuit 200 receives the operation, sign and correction signals m, $w_1$ and z, a high level signal appears from AND-gate 202a in response to the sign and correction signals $w_1$, z and is applied through NOR-gates 203a, 204a to AND-gate 205a. Then, a high level signal is produced from AND-gate 205a in response to the operation signal m and the high level signal from NOR-gate 204a and is applied through OR-gate 206 to the third transistor circuit 223 of drive circuit 220 as a first distribution signal. Then, the transistors $TR_6$, $TR_7$ are turned on due to the first distribution signal so that the transistor $TR_7$ produces a third output signal to energize the solenoid 28a of valve 28. Thus, the solenoid valve 28 is opened to permit supply of negative pressure from induction passage 11 into the servo-chamber 23 of servomotor 20. As a result, the diaphragm 22 of servomotor 20 is displaced downward to increase the opening angle of throttle valve 12.

Upon completion of the count-down operation, the counter 192 produces a low level signal. Then, the exclusive OR-gate 197 produces a low level signal in response to the low level signals from counter 192 and exclusive OR-gate 196 so that the counter 194 starts to count down a value of the binary signal v in accordance with a series of the second clock signals $C_2$ through NAND-gate 195. At this stage, the exclusive OR-gate 198 maintains generation of the correction signal z due to the high and low level signals from counter 194 and exclusive OR-gate 196. When the count-down operation is completed, the counter 194 produces a low level signal which is applied to the exclusive OR-gate 198 to make the correction signal z a low level signal. Then, AND-gate 202a of distribution circuit 200 produces a low level signal at a trailing edge of the correction signal z to make the first distribution signal from OR-gate 206 a low level signal under control of NOR-gates 203a, 204a and AND-gate 205a. Thus, the transistors $TR_6$, $TR_7$ are turned off so that the solenoid valve 28 is closed due to deenergization of solenoid 28a to block the supply of negative pressure from induction passage 11 into the servo-chamber 23. As a result, the downward displacement of diaphragm 22 in servomotor 20 is ceased to maintain the increased opening angle of throttle valve 12.

From the above description, it will be understood that the opening angle of throttle valve 12 is increased in accordance with a width of the correction signal z defined by the sum of respective values of the binary signals v and w and that the rate of decreasing the actual vehicle speed is restrained due to the increase of throttle opening angle to accelerate the vehicle toward the command speed.

Assuming that at this stage, the timing signal generator 130 produces a gate signal $b_M$ with a period of time $T_M$ and latch, preset and reset signals $d_M$, $e_M$ and $f_M$ in sequence, the gate signal $b_M$ is applied to cancellation circuit 150, command-speed set circuit 160 and acceleration calculation circuit 180, and the latch signal $d_M$ is applied to control signal generator 140 and circuits 150, 170, 180. The preset signal $e_M$ is also applied to control and correction signal generators 140, 190 and calculation circuits 170, 180, and the reset signal $f_M$ is applied to control signal generator 140 and circuits 150, 160 and 180. In addition, the period of time $T_M$ of gate signal $b_M$ is still longer than the period of time $T_1$ of gate signal $b_1$ due to the vehicle loads but is shorter than a period of time $T_{M-1}$ of a gate signal $b_{M-1}$ prior to the gate signal $b_M$.

When the preset signal $e_M$ from timing signal generator 130 is applied to calculation circuits 170, 180, the counters 171 to 173 again preset therein the binary signal u from command-speed set circuit 160 and start to count down the value of binary signal u at a trailing edge of gate signal $b_M$ in accordance with a series of the first clock signals $C_1$. Simultaneously, the counters 183a to 183c preset therein a binary signal indicative of the period of time $T_{M-1}$ of gate signal $b_{M-1}$ previously issued from timing signal generator 130. Then, the counters 183a to 183c start to count down the period of time $T_{M-1}$ of the same binary signal at the trailing edge of gate signal $b_M$ in accordance with a series of the first clock signals $C_1$. Upon completing the count-down operation, the counters 183a, 183b produce a binary signal indicative of a second time difference $|T_{M-1}-T_M|$ corresponding with the remaining value of the period of time $T_{M-1}$. In other words, the binary signal from counters 183a, 183b is applied to latch circuits 186a, 186b as a binary signal indicative of controlled acceleration of the vehicle corresponding with the second time difference $|T_{M-1}-T_M|$. At this stage, the counter 183c produces a high level signal to generate a low level signal from D-flip flop 185 under control of NOR-gate 184, as previously described. When the counter 173 produces a low level signal upon completion of each count-down operation in counters 171 to 173, D-flip flop 175 produces a high level signal. Upon receiving the high level signal from D-flip flop 175, the counters 171 to 173 start to count up the remaining first clock signals $C_1$ defined by the period of time $T_M$ of gate signal $b_M$.

When a gate signal $b_{M+1}$ with a period of time $T_{M+1}$ and latch, preset and reset signals $d_{M+1}, e_{M+1}$ and $f_{M+1}$ following the gate signal $b_M$ are produced from the timing signal generator 130, each count-up operation of the counters 171 to 173 is completed at a leading edge of gate signal $b_{M+1}$. Then, a binary signal indicative of a first time difference $|T_1-T_M|$ is produced from the counters 172, 173 and applied to latch circuits 176, 177. This means that the binary signal from counters 172, 173 is applied to latch circuits 176, 177 as a binary signal indicative of controlled speed difference of the vehicle corresponding with the first time difference $|T_1-T_M|$. Subsequently, the binary signal from counters 172, 173 is latched and applied by latch circuits 176, 177 to the correction signal generator 190 as a binary signal v in response to the latch signal $d_{M+1}$, and simultaneously the high level signal from D-flip flop 175 is inverted by D-flip flop 178 and applied to the correction signal generator 190 as a sign signal $v_1$ of low level or negative sign. The binary signal from counters 183a, 183b is also latched by latch circuits 186a, 186b and applied through OR-gates 188a, 188b, 188c, 188d and 189 to the correction signal generator 190 as a binary signal w in response to the latch signal $d_{M+1}$, and simultaneously the low level signal from D-flip flop 185 is inverted by D-flip flop 187 and applied as a sign signal $w_1$ of high level or positive sign to the correction signal generator 190 and distribution circuit 200.

When the exclusive OR-gate 196 of correction signal generator 190 receives the sign signal $v_1$ of low level from calculation circuit 170 and the sign signal $w_1$ of high level from calculation circuit 180, it produces a high level signal which is applied to the exclusive OR-gates 197, 198. Upon receiving the preset signal $e_{M+1}$ from timing signal generator 130, the down counters 192 and 194 preset therein the binary signals w and v under control of inverter 191. Then, the counter 192 starts to count down a value of the binary signal w in accordance with a series of the third clock signals $C_3$ so as to produce a high level signal at its carry-out terminal CO, and the exclusive OR-gate 197 also produces a low level signal in response to the high level signals from counter 192 and exclusive OR-gate 196. In response to the low level signal from exclusive OR-gate 197, the counter 194 starts to count down a value of the binary signal v in accordance with a series of the second clock signals $C_2$ so as to produce a high level signal. In this instance, the exclusive OR-gate 198 does not produce any correction signal z due to the high level signals from counter 194 and exclusive OR-gate 196.

Assuming that the second time difference $|T_{M-1}-T_M|$ is larger than the first time difference $|T_1-T_M|$, the count-down operation of counter 194 is completed prior to that of counter 192. Upon completing the count-down operation, the counter 194 produces a low level signal. Then, a correction signal z appears from exclusive OR-gate 198 is response to the low and high level signals from counter 194 and exclusive OR-gate 196 and is applied to distribution circuit 200. When the distribution circuit 200 receives the sign signal $w_1$ of high level and the operation and correction signals m and z, a high level signal appears from AND-gate 202b in response to the sign and correction signals $w_1$ and z and is applied through NOR-gates 203b, 204b to AND-gate 205b. Then, a high level signal appears from AND-gate 205b in response to the operation signal m and a high level signal from NOR-gate 204b and is applied to the second transistor circuit 222 of drive circuit 220 through AND-gate 208 as a second distribution signal. Subsequently, the transistors $TR_4, TR_5$ are turned on due to the second distribution signal so that the transistor $TR_5$ produces a second output signal to energize the solenoid 27a of valve 27. Thus, the solenoid valve 27 is opened to permit supply of the atmospheric pressure from the exterior into the servo-chamber 23 of servomotor 20. As a result, the diaphragm 22 of servomotor 20 is displaced upward to decrease the opening angle of throttle valve 12.

On the other hand, the counter 192 produces a low level signal upon completion of its count-down operation. Then, the exclusive OR-gate 197 produces a high level signal due to the low and high level signals from counter 192 and exclusive OR-gate 196. Thus, the counter 194 produces a high level signal to make the correction signal z a low level signal. Subsequently, AND-gate 202b of distribution circuit 200 produces a low level signal at a trailing edge of the correction signal z to make the second distribution signal a low level signal under control of NOR-gates 203b, 204b and AND-gate 205b. Thus, the transistors $TR_4, TR_5$ are turned off so that the solenoid valve 27 is closed due to deenergization of solenoid 27a to block the supply of the atmospheric pressure into servo-chamber 23. As a result, the upward displacement of diaphragm 22 in servomotor 20 is ceased to maintain the decreased opening angle of throttle valve 12.

From the above description, it will be understood that the opening angle of throttle valve 12 is adjusted in accordance with a width of the correction signal z defined by the difference between respective values of the binary signals v and w and that the rate of increasing the actual vehicle speed is restrained due to the decrease of throttle opening angle to decelerate the vehicle toward the command speed. This means that the throttle opening angle is precisely controlled by the speed control system to restrain change of acceleration of the vehicle so as to maintain the command speed of the vehicle. When the actual speed of the vehicle is increased due to decrease of the vehicle loads, the opening angle of throttle valve 12 will be controlled by the speed control system to maintain the command speed of the vehicle in such a manner as described above.

In operation of the speed control system described above, it should be understood that if the vehicle is suddenly accelerated due to traveling on a rough road at a command speed, a value of the binary signal w' from latch circuits 186a, 186b in calculation circuit 180 will be more than sixteen (16) in decimal notation. In this instance, OR-gate 189 acts to produce a binary signal indicative of fifteen (15) through OR-gates 188a to 188d. This serves to prevent the engine throttle from its sudden operation caused by the sudden acceleration of the vehicle, chattering of the speed sensor 30, various detecting noises and the like.

Figure 10:
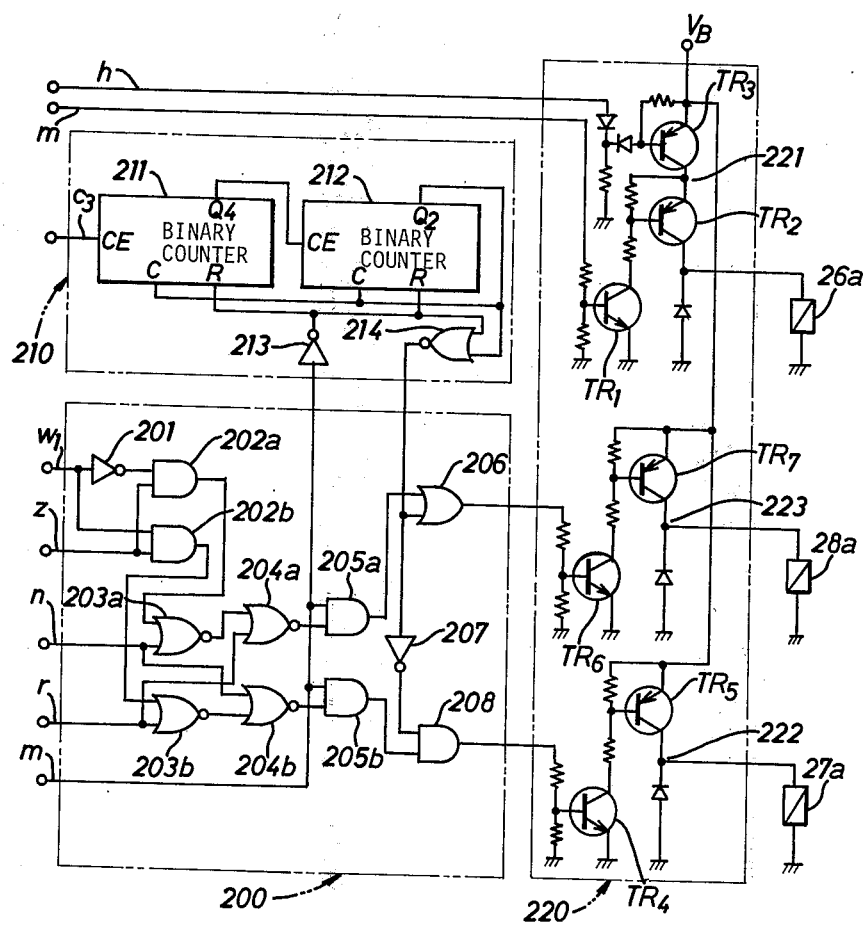
FIG. 10 illustrates each preferred embodiment of the distribution circuit, initial setting signal generator and drive circuit respectively shown in block form in FIG. 1.

In case the operator wishes to increase the command speed to a higher value, the acceleration switch 60 is manually closed to produce an electric signal, which is applied to control signal generator 140. Then, the electric signal from acceleration switch 60 is inverted by inverter 147 of control signal generator 140 and applied as an acceleration signal n to NOR-gate 149 and distribution circuit 200 (see FIGS. 4, 10). When a low level signal is produced from NOR-gate 149 in response to the acceleration signal n, it is applied to OR-gate 146 to generate a high level signal from NAND-gate 141. Meanwhile, a low level signal is produced from NOR-gate 203a of distribution circuit 200 in response to the acceleration signal n and applied as a high level signal to AND-gate 205a under control of NOR-gate 204a. Then, a high level signal is produced from AND-gate 205a in response to the operation signal m and the high level signal from NOR-gate 204a and, in turn, applied as a first distribution signal to the third transistor circuit 223 of drive circuit 200 through OR-gate 206. Thus, the transistors $TR_6$, $TR_7$ are turned on in response to the first distribution signal so that the transistor $TR_7$ produces a third output signal, which is applied to the solenoid 28a of valve 28. As a result, the solenoid valve 28 is opened due to energization of solenoid 28a to permit supply of negative pressure from induction passage 11 into the servo-chamber 23 of servomotor 20.

When the supply of negative pressure into the servo-chamber 23 is continued by closing the acceleration switch 60, the opening angle of throttle valve 12 is increased to accelerate the vehicle. When the vehicle speed reaches the desired higher value over the previous command speed, the acceleration switch 60 is released to cease generation of the acceleration signal n from control signal generator 140. Then, the high level and first distribution signals from NAND-gate 141 of control signal generator 140 and OR-gate 206 of distribution circuit 200 disappear. Thus, the solenoid valve 28 is closed due to deenergization of solenoid 28a to isolate the servo-chamber 23 from the induction passage 11, whereas a command-speed signal $j_2$ is produced from the control signal generator 140 immediately after generation of the low level signal from NAND-gate 141. Thereafter, the solenoid valves 27, 28 are controlled by the electronic control circuit EC to maintain the actual speed of the vehicle at the desired higher value.

In case the operator wishes to decrease the vehicle command speed to a lower value, the deceleration switch 70 is manually closed to produce an electric signal, which is applied to control signal generator 140. Then, the electric signal from deceleration switch 70 is inverted by inverter 148 of control signal generator 140 and applied as a deceleration signal r to NOR-gate 149 and distribution circuit 200 (see FIGS. 4, 10). When a low level signal is produced from NOR-gate 149 in response to the deceleration signal r, it is applied to OR-gate 146 to generate a high level signal from NAND-gate 141. Meanwhile, a low level signal is produced from NOR-gate 203b of distribution circuit 200 in response to the deceleration signal r and applied a high level signal to AND-gate 205b under control of NOR-gate 204b. Then, a high level signal is produced from AND-gate 205b in response to the operation signal m and the high level signal from NOR-gate 204b and, in turn, applied as a second distribution signal to the second transistor circuit 222 of drive circuit 220 through AND-gate 208. Thus, the transistors $TR_4$, $TR_5$ are turned on in response to the second distribution signal so that the transistor $TR_5$ produces a second output signal, which is applied to the solenoid 27a of valve 27. As a result, the solenoid valve 27 is opened due to energization of solenoid 27a to premit supply of the atmospheric pressure from the exterior into the servo-chamber 23.

When the supply of the atmospheric pressure into the servo-chamber 23 is continued by closing the deceleration switch 70, the opening angle of throttle valve 12 is decreased to decelerate the vehicle. When the vehicle speed reaches the desired lower value, the deceleration switch 70 is released to cease generation of the deceleration signal r from control signal generator 140. Then, the high level and second distribution signals from NAND-gate 141 and AND-gate 208 disappear. Thus, the solenoid valve 27 is closed due to deenergization of solenoid 27a to isolate the servo-chamber 23 from the exterior, whereas a command-speed signal $j_3$ is produced from control signal generator 140 immediately after generation of the low level signal from NAND-gate 141. Thereafter, the solenoid valves 27, 28 are controlled by the control circuit EC so that the vehicle is maintained by the servomotor 20 at the desired lower speed.

In case the actual speed of the vehicle changes out of a predetermined range controlled by the speed control system, a release signal s is produced from the cancellation circuit 150, as previously described, and applied to D-flip flop 143c of control signal generator 140 through OR-gates 144, 145 to cease generation of the operation signal m. Thus, the solenoid valve 26 is opened due to deenergization of the first transistor circuit 221, and the solenoid valves 27, 28 are closed due to deenergization of the second and third transistor circuits 222, 223 under control of the distribution circuit 200. In addition, the above operation is also conducted by actuation of the cancel switch 50.

In the actual practice of the present invention, the throttle actuator AC may be replaced with an electrically operated mechanism which includes a reduction-speed gear unit operatively coupled to an electric reversible motor through an electromagnetic clutch, and a rach-and-pinion disposed between the gear unit and the throttle valve 12 to transmit rotation of the gear unit to the throttle valve 12 as linear motion. With this mechanism, when the electromagnetic clutch is engaged in response to the first output signal from drive circuit 220, the gear unit is connected to the electric reversible motor. When the reversible motor is rotated in one direction in response to the second output signal from drive circuit 220, the gear unit is rotated to decrease the opening angle of throttle valve 12 in relation to linear motion given by the rack-and-pinion. When the reversible motor is rotated in the other direction in response to the third output signal from drive circuit 220, the gear unit is reversely rotated to increase the opening angle of throttle valve 12 in relation to the linear motion.

Furthermore, the speed sensor 30 may be replaced with a sensor in the form of an AC generator or a photocoupler having a photo transistor and a light emission diode. The command-speed set circuit 160 may be also replaced with an electronic circuit in which a binary signal indicative of a period of time corresponding with a desired speed of the vehicle is produced by manipulation of a digital code switch independently of clock circuit 110, timing signal generator 130 and control signal generator 140. The correction signal generator 190 may be also replaced with another electronic circuit for producing a binary signal indicating an absolute value of the sum or difference of respective values of the binary signals v and w in relation to the sign signals $v_1$ and $w_1$ and for producing another sign signal indicative of one of positive and negative signs of the sum or the difference. When the binary and sign signals from the electronic circuit are applied to distribution circuit 200, the actual speed of the vehicle is precisely controlled at the desired value even if a change of the difference between the command and actual speeds is larger than that of acceleration of the vehicle.

It is further noted that in the acceleration calculation circuit 180, OR-gates 188a to 188d may be replaced with AND-gates respectively and OR-gate 189 may be also replaced with a NOR-gate. In addition, the limited value of the binary signal w' from latch circuits 186a, 186b may be determined on a basis of acceleration of 0.02G irrespectively of the command speed of the vehicle.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A speed control system for an automotive vehicle driven by an internal combustion engine under control of a throttle valve, the control system comprising:

first means for producing a timing signal with a period of time responsive to the actual speed of the vehicle;

second means for producing a command signal indicative of a predetermined period of time defined by a desired speed of the vehicle;

third means responsive to the timing signal for calculating a first time difference between the predetermined period of time and the actual period of time of the timing signal and for producing a first difference signal indicative of an absolute value of the calculated first time difference and a first sign signal indicative of the positive or negative sign of the calculated first time difference;

fourth means responsive to the timing signal for calculating a second time difference between respective actual periods of time of the preceding and following timing signals and for producing a second difference signal indicative of an absolute value of the calculated second time differene and a second sign signal indicative of the positive or negative sign of the calculated second time difference;

fifth means for limiting a value of the second difference signal to a predetermined maximum value when the actual acceleration of the vehicle exceeds a maximum value;

sixth means responsive to the timing signal for calculating a sum of the absolute values when respective signs of the first and second sign signals are identical to each other and for calculating a difference between the absolute values when respective signs of the first and second sign signals are opposite to each other, said sixth means selectively producing first and second correction signals respectively indicative of the calculated sum and the calculated difference and ceasing to produce the first and second correction signals when the respective calculated values are zero;

seventh means responsive to the timing signal and one of the first and second correction signals for selectively producing first and second control signals respectively in relation to the positive and negative signs of the second sign signal; and actuator means for decreasing and increasing the opening angle of said throttle valve respectively in response to the first and second control signals.

2. A speed control system as claimed in claim 1, wherein said fifth means is arranged to limit a value of the second difference signal to a predetermined maximum value when the actual acceleration of the vehicle exceeds a maximum value relative to each command speed of the vehicle.

3. A speed control system as claimed in claim 1, wherein said fifth means is arranged to limit a value of the second difference signal to a predetermined maximum value when the actual acceleration of the vehicle exceeds 0.02 gravity.

4. A speed control system as claimed in claim 1, further comprising a clock circuit for producing a series of clock signals at a constant frequency in sequence; and wherein said fourth means includes a first counter circuit for counting the number of the clock signals defined by the proceding timing signal, and a second counter circuit for counting down the number of the previously counted clock signals responsive to the following timing signal when a period of time of the preceding timing signal is longer than that of the following timing signal and successively counting up the number of the clock signals defined by the following timing signal after completion of counting down the number of the previously counted clock signals when a period of time of the preceding timing signal is shorter than that of the following timing signal, said second counter circuit producing a second difference signal indicative of an absolute value of a difference between the number of the clock signals respectively defined by the preceding and following timing signals and producing second positive and negative sign signals respectively when the number of the previously counted clock signals is counted down and when the number of the clock signals defined by the following timing signal is counted up, and wherein said fifth means is a logic circuit for limiting a value of the second difference signal to a predetermined maximum value when the actual acceleration of the vehicle exceeds a maximum value relative to each command speed of the vehicle.

5. A speed control system as claimed in claim 4, wherein said logic circuit comprises a plurality of OR-gates for applying the second difference signal therethrough to said sixth means when a value of the second difference signal is less than a predetermined maximum value and another OR-gate for applying a second difference signal indicative of the said predetermined maximum value through said first-named OR-gates when a value of the second difference signal exceeds the said predetermined maximum value.

* * * * *